(12) United States Patent
Wang et al.

(10) Patent No.: US 8,373,932 B2
(45) Date of Patent: Feb. 12, 2013

(54) AUTO-FOCUSING LENS MODULE

(75) Inventors: Chy-Lin Wang, Taipei (TW); Chir-Weei Chang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 177 days.

(21) Appl. No.: 12/620,597

(22) Filed: Nov. 18, 2009

(65) Prior Publication Data

US 2010/0321788 A1    Dec. 23, 2010

(30) Foreign Application Priority Data

Jun. 22, 2009    (TW) ................................ 98120872 A

(51) Int. Cl.
G02B 3/12    (2006.01)
G02B 13/18    (2006.01)
(52) U.S. Cl. .......................... 359/666; 359/716; 359/708
(58) Field of Classification Search .......... 359/665–667, 359/708–718
See application file for complete search history.

(56) References Cited

U.S. PATENT DOCUMENTS

| | | | |
|---|---|---|---|
| 7,253,963 B2 | 8/2007 | Lee et al. | |
| 7,855,838 B2 * | 12/2010 | Jannard et al. | 359/665 |
| 2001/0017985 A1 * | 8/2001 | Tsuboi et al. | 396/506 |
| 2004/0228003 A1 * | 11/2004 | Takeyama et al. | 359/666 |
| 2006/0056042 A1 | 3/2006 | Kim et al. | |
| 2006/0164732 A1 * | 7/2006 | Lee et al. | 359/676 |
| 2007/0229970 A1 | 10/2007 | Kim | |
| 2009/0091844 A1 | 4/2009 | Jannard et al. | |

FOREIGN PATENT DOCUMENTS

TW    200923464    6/2009

OTHER PUBLICATIONS

Klein, Miles V., and Thomas E. Furtak. Optics. New York: Wiley, 1986. 135-138. Print.*
Geary, Joseph M. Introduction to Lens Design: With Practical ZEMAX Examples. Richmond, VA: Willmann-Bell, 2002. p. 23. Print.*
"1st Office Action of China counterpart application", issued on Aug. 24, 2011, p. 1-5, in which the listed references were cited.
"Second Office Action of China counterpart application" issued on Jun. 5, 2012, p. 1-p. 5, in which the listed reference was cited.

* cited by examiner

*Primary Examiner* — Ricky Mack
*Assistant Examiner* — Zachary Wilkes
(74) *Attorney, Agent, or Firm* — Jianq Chyun IP Office

(57) ABSTRACT

An auto-focusing lens module includes an object lens, a liquid zooming unit, and an image lens group. The object lens and the liquid zooming unit receive an object image in front and condense the image into a first-stage output light. A zoom quantity is determined by an external control on the liquid zooming unit. The image lens group including a first and second lens receives the first-stage output light to transmit a second-stage output light. The first lens has a first and second surface, in which the second surface is farther than the first surface to the liquid zooming unit and has a convex curving surface protruding toward an image sensor. The second lens has a first and second surface, in which the first surface has a concave curving surface indenting toward the image sensor to adapt at least a portion of the convex curving surface of the first lens.

19 Claims, 24 Drawing Sheets

AUTO-FOCUSING LENS MODULE

CROSS-REFERENCE TO RELATED APPLICATION

This application claims the priority benefit of Taiwan application serial no. 98120872, filed on Jun. 22, 2009. The entirety of the above-mentioned patent application is hereby incorporated by reference herein and made a part of specification.

BACKGROUND

1. Technical Field

The disclosure is generally related to an auto-focusing lens including a liquid zooming unit. More particularly, the liquid zooming unit can have controlled zooming that can be applicable in a camera.

2. Description of Related Art

Conventionally, an interface for a liquid lens is formed by using two mutually dissoluble liquids, such as water and oil, in which the liquids have similar densities to each other. Due to electrowetting effects, when a suitable voltage is applied on the side walls confining the two liquids, generating an electric field, the curvature of the interface is altered, thereby changing the optical power of the interface and achieving similar focusing effects to mechanically displaced lenses. Due to the ease of curvature change, it has become advantageous to use the liquid lens as a zooming unit.

Lens groups utilizing liquid lenses have been previously disclosed. For example, disclosures in U.S. Publication No. 2006/0056042 and 2007/0229970 have suggested liquid lenses capable of zooming functions. However, for the liquid lenses described in the two disclosures, sequence of the refractive indices of the two liquids are restricted, and the whole lense group has large overall thicknesses.

Lens sizes have been in a trend toward miniaturization. Conventional auto-focusing optical lenses require movable lenses and movable space, therefore decreasing lens volume has been difficult. Moreover, since conventional auto-focusing optical lenses also require mechanical parts for the movable lenses, more power consumption and space requirements are needed, thereby complicating efforts toward miniaturization. In addition, because the range of object distances for photo taking is restricted from infinity to 10 cm, picture quality of close-up shots is poorer and auto-focus speed is slower. Furthermore, such conventional lenses require back optical power adjustments, but optical components capable of complex movements may be fragile and unreliable.

SUMMARY

Embodiments of the disclosure may provide an auto-focusing lens module that includes an object lens, a liquid zooming unit, and an image lens group. The object lens and the liquid zooming unit receive an object image in front and condenses the object image into a first-stage output light. A zoom quantity of the liquid zooming unit is determined by an external control. The image lens group outputs a second-stage output light after receiving the first-stage output light. The image lens group includes a first lens and a second lens. The first lens has a first surface and a second surface, in which the second surface is farther away from the liquid zooming unit than the first surface, and the second surface has a convex curving surface protruding toward an image sensor. The second lens has a first surface and a second surface, in which the first surface has a concave curving surface indenting toward the image sensor to adapt at least a portion of the convex curving surface of the first lens, and the second surface outputs the second-stage output light.

In order to make the aforementioned and other features of the disclosure more comprehensible, several embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

Figure 1:
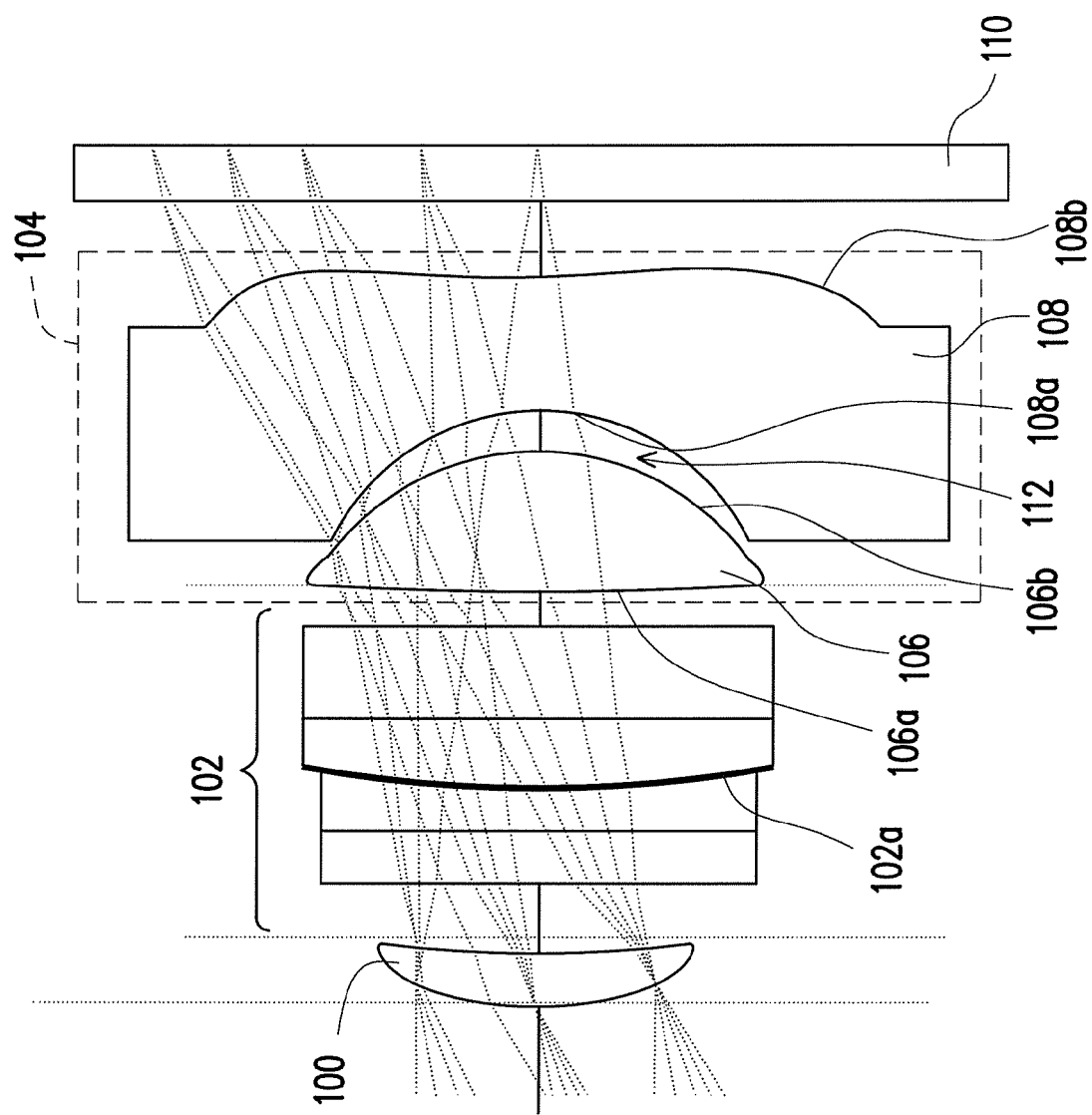
FIG. 1 is a cross-sectional schematic diagram of the lenses in an auto-focusing lens module in accordance with one embodiment of the disclosure.

The disclosure may provide an auto-focusing lens module that has a substantially smaller overall thickness and has more design freedom for the liquid zooming unit. The liquid zooming unit can be implemented from a plurality of readily available products. Several embodiments are provided hereinafter to describe the disclosure. However, the disclosure is not limited by the embodiments described herein. Furthermore, the embodiments described hereinafter can be combined.

Embodiments of the disclosure may provide an auto-focusing lens module including an optical design for overall miniaturization of the liquid lens, in which optical components remain stationary during focusing. Object distance range is increased from infinity to 5 cm while still providing clear picture quality. Moreover, flexibility of design is provided for the liquid lens in which a plurality of liquid types can be selected for the liquid lens. Embodiments of the disclosure may provide designs that substantially decrease the total length of the lens module as well as the precision required for manufacture and assembly, thereby reducing costs.

In particular, embodiments of the disclosure may provide stop arrangements that substantially decrease the total size of the auto-focusing lens module while maintaining high quality optical characteristics.

In order to maintain image quality and provide miniaturization of the auto-focusing lens module, two adjacent surfaces of the final two lenses of the auto-focusing lens module have a concave-convex design adapted to a portion of a convex lens, thereby further decreasing the total length of the lens module.

Most commercially available liquid lenses have effective apertures of less than 3 mm, while most high pixel (2 million pixels and above) image sensors measure more than 4.4 mm diagonally. The stop designs of embodiments in the disclosure consider the limited amount of available space, along with the requirement that the liquid lens be disposed in front of the auto-focusing lens module (closer to object side) or in the middle region. Furthermore, the stop designs consider that light beams need to pass through the liquid lens in such a way that substantial amounts of off-axis light beams are not blocked by the liquid lens, since brightness difference between the edge and center of the image sensor can vary by more than 50%. Moreover, considerations are made for the increase in manufacture and assembly precision. Considering limitations such as the above, the stop is disposed near the liquid lens. In light of the foregoing, by disposing the stop near the liquid lens, the disclosure passes substantially all of the near-axis and off-axis light beams through the liquid lens while decreasing the required manufacture and assembly precision, thereby reducing costs.

Since manufacture and assembly precision of the object lenses are easier to control, an object lens disposed near the stop is arranged in such a way that substantially more image aberrations, and thus more required manufacturing and assembling precision, are distributed thereto. Accordingly, since manufacturing and assembling precision of the liquid lenses are more difficult to control, the liquid lens is arranged in such a way that substantially less image aberrations, and hence less manufacturing and assembling precision requirements, are distributed thereto. Furthermore, since liquid lenses of different manufacturers have different levels of manufacture and assembly precision, the aforementioned stop designs do not restrict less precisely-made liquid lenses from being implemented in the embodiments of the disclosure. In light of the above, a major consideration in the aforementioned optical designs is the required manufacturing and assembling precision of the liquid lens.

Embodiments of the disclosure may provide a plurality of combinations of stops, liquid lenses, and object lenses. These combinations substantially decrease the required precision for manufacturing and assembling the liquid lens, thereby reducing costs. Further, miniaturization of the auto-focusing lens module is achieved and high quality optical characteristics are maintained for the lens module.

In addition, embodiments of the disclosure may provide designs that further decrease the total length of the auto-focusing lens module, in which two adjacent surfaces of the last two lenses have a concave-convex design adapting to a portion of the convex lens, thereby decreasing total length and maintaining image quality.

FIG. 1 is a cross-sectional schematic diagram of the lenses in an auto-focusing lens module in accordance with one embodiment of the disclosure. Referring to FIG. 1, the auto-focusing lens module includes an object lens 100, a liquid zooming unit 102, and an image lens group 104. In the present embodiment of the disclosure, the object lens 100 can be disposed in front, for example. The object lens 100 receives light from an object image and condenses the light into an output light. A stop is disposed on the object lens 100. The liquid zooming unit 102 determines a zoom quantity according to an external control. Thereafter, the output light of the object lens 100 is adjusted to form another stage of output light. The image lens group 104 receives the output light and transmits the next stage of output light. The output light at this stage represents an image light that is received by an image sensor 110. The image sensor 110 can be an image sensor of a camera, for example. In the present embodiment of the disclosure, the image sensor 110 is a planar substrate with a sensor array that can be disposed on a back surface of the image sensor 110.

The image lens group 104 can include a first lens 106 and a second lens 108, for instance. The first lens 106 has a first surface 106a and a second surface 106b. The first surface 106a can be a slightly convex lens surface. The second surface 106b of the first lens 106 is farther away from the liquid zooming unit 102 than the first surface 106a, and the second surface 106b has a convex curving surface protruding towards the image sensor 110. The second lens 108 has a first surface 108a and a second surface 108b, in which the first surface 108a has a concave curving surface in the center of the light path. The concave curving surface is indenting toward the image sensor 110, and the first surface 108a is adapted to at least a portion of the convex curving surface of the first lens 106. Although the present embodiment of the disclosure does not limit the degree of convexity, an exemplary degree of convexity can be over half of a thickness, or over two-thirds of the thickness. The image lens group 104 transmits the image light to the image sensor 110. The second surface 108b can be modified to compensate for image distortion. The first lens 106 and the second lens 108 can each be a single lens, or each lens can be a composite lens.

In addition, the second surface 106b of the first lens 106 can be spherical or aspherical according to predetermined design considerations. The concave curving surface of the first surface 108a of the second lens 108 can also be aspherical, and a gap 112 therebefore can be increasingly smaller from center to edge. Due to the convex and concave curving surfaces, the thickness of the image lens group 104 is substantially reduced, and therefore the thickness of the entire auto-focusing lens module is also reduced. On the other hand, the second surface 108b of the second lens 108 is modified according to the light path therebefore, in order to compensate for image distortion, for example.

With an electric field generated in the side walls of the liquid zooming unit 102 changing the curvature of an interface 102a formed by two liquids, for example, an auto-focus capability can be gained.

The present embodiment of the disclosure provides a liquid lens in an auto-focusing lens module, in which the liquid lens is formed by two mutually dissoluble liquids each having a different refractive index but both having similar densities. In front of the liquid lens (object side), there is at least one object lens having nonzero optical power. The total optical power of the liquid lens and the object lens before it is a positive value. Behind the liquid lens (image side), there are at least two lenses each having nonzero optical power. Behind the liquid lens (image side), the first surface of the lens closest to the image sensor is concave with respect to the object side, and the sag value of the first surface is for example, a negative value (curvature is negative), and its optical power is a negative value. Behind the liquid lens (image side), the second surface of the second to last lens is convex with respect to the image side, and the optical power of the second surface is a positive value. On the image side, the concave-convex shape of the two lenses behind the liquid lens can substantially reduce the total length of the auto-focusing lens module.

Figure 2:
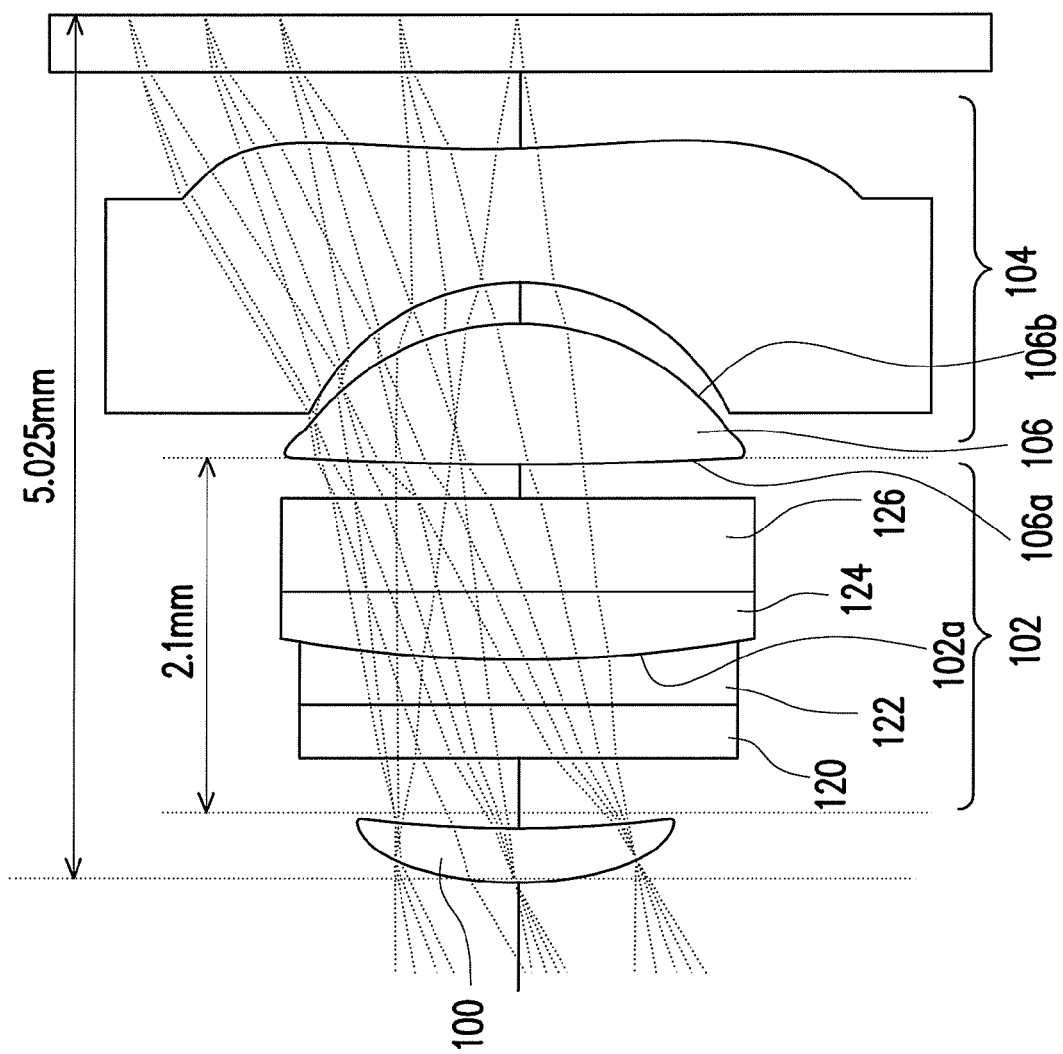
FIG. 2 is a cross-sectional schematic diagram of the lenses in the auto-focusing lens module in accordance with one embodiment of the disclosure.

The liquid zooming unit 102 is further described below. FIG. 2 is a cross-sectional schematic diagram of the lenses in the auto-focusing lens module in accordance with one embodiment of the disclosure. Referring to FIGS. 1 and 2, the liquid zooming unit 102 includes, for example, a light transmissive substrate 120 disposed near the object lens 100. Another light transmissive substrate 126 is disposed near the first lens 106 of the image lens group 104. The first liquid 122 has a first refractive index. The second liquid 124 has a second refractive index, and the first and second liquids are mutually dissoluble. For instance, these two liquids can be water and oil. Since the two liquids are mutually dissoluble, the first liquid 122 and the second liquid 124 form an interface 102a. Moreover, the two liquids are sandwiched between the light transmissive substrates 120 and 126. The side walls can be a cylindrical walls (not shown) arranged to form an enclosed space. A plurality of electrodes can be disposed on the cylindrical walls. The side wall and electrode arrangements are well known to persons having ordinary skill in the arts, so no further description is provided herein. By applying a control voltage to the electrodes, the optical power of interface 102a can be changed by altering the curvature of interface 102a. In addition, the thickness of the liquid zooming unit 102 can be 2.1 mm, while the total thickness of the auto-focusing lens module can be 5.025 mm, for example.

Figure 3:
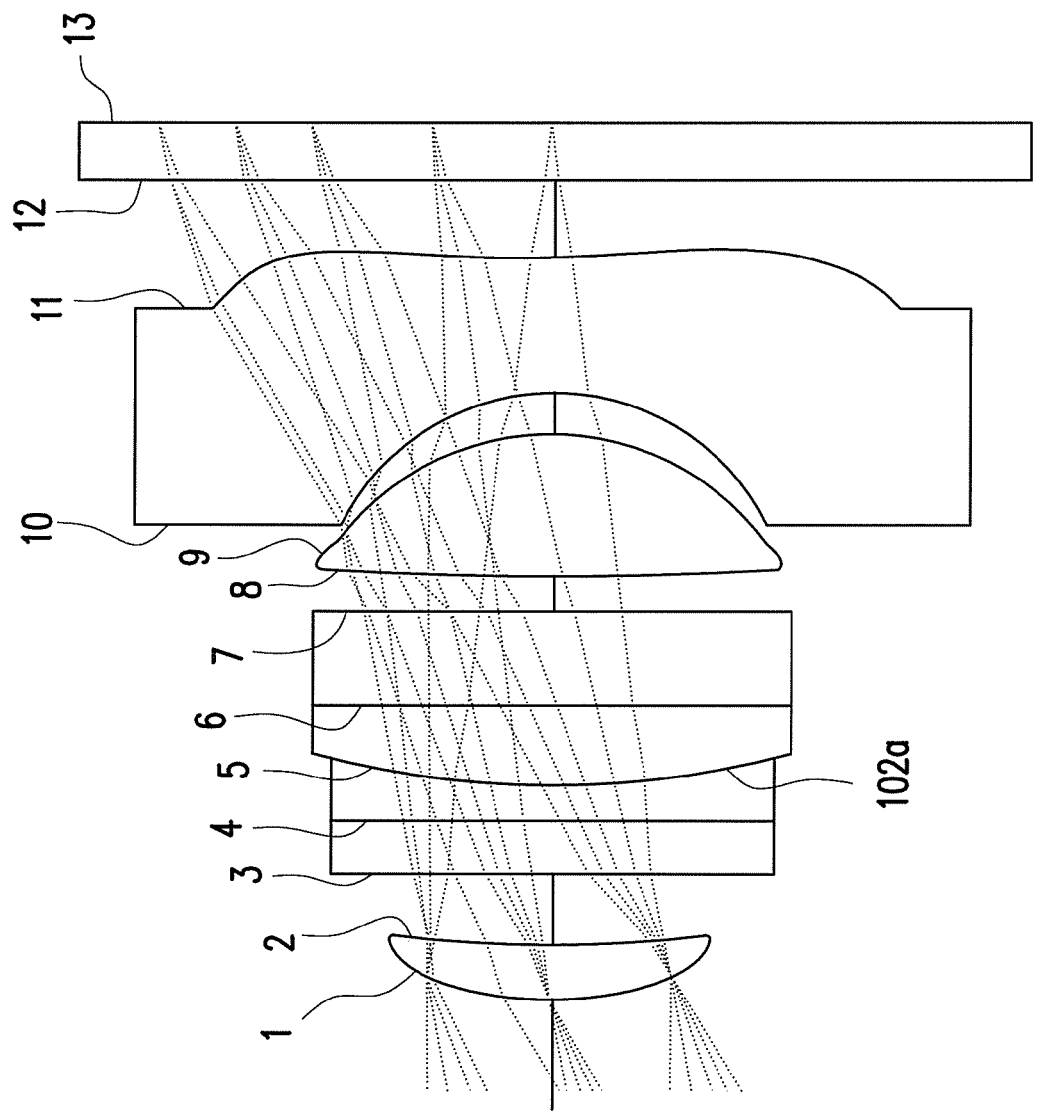
FIGS. 3-8 are schematic diagrams illustrating the zooming mechanism for the auto-focusing lens module in accordance with a plurality of embodiments of the disclosure.

FIGS. 3-8 are schematic diagrams illustrating the zooming mechanism for the auto-focusing lens module in accordance with a plurality of embodiments of the disclosure. Referring to FIG. 3, the auto-focusing lens module includes 13 optical surfaces. A stop is disposed on optical surface 1 to limit aperture size. In the present embodiment of the disclosure, the stop is directly disposed on optical surface 1, for instance by attachment to the lens surface. However, the spirit and scope of the disclosure is not limited thereto; for instance, the stop can be arranged independently from the lens surface. In addition, optical surface 13 represents the back surface of the image sensor 110. A sensor array is disposed on the back surface of the image sensor 110. Each of the 13 optical surfaces has a radius of curvature and a thickness, while refractive index $n_d$ and Abbe number $v_d$ are derived from the materials selected. Table 1 lists the numerical data of the 13 optical surfaces in accordance with one embodiment of the disclosure.

TABLE 1

| Optical Surface | | Radius of Curvature (mm) | Thickness (mm) | Material |
|---|---|---|---|---|
| 1 | Asphere1 | 1.828612 | 0.32972 | (1.531, 56) |
| 2 | Asphere2 | 10.34366 | 0.401429 | |
| 3 | Sphere | ∞ | 0.3 | (1.5231, 55) |
| 4 | Sphere | ∞ | 0.26 * T1 | (1.489, 38.4) |

TABLE 1-continued

| Optical Surface | | Radius of Curvature (mm) | Thickness (mm) | Material |
|---|---|---|---|---|
| 5 | Sphere | 8.54 * Radius | 0.39 * T2 | (1.4, 58.7) |
| 6 | Sphere | ∞ | 0.55 | (1.5231, 55) |
| 7 | Sphere | ∞ | 0.210155 | |
| 8 | Asphere3 | 11.41561 | 0.825354 | (1.531, 56) |
| 9 | Asphere4 | −1.17869 | 0.223583 | |
| 10 | Asphere5 | −1.14117 | 0.784759 | (1.607, 27) |
| 11 | Asphere6 | 6.187793 | 0.65 | |
| 12 | Sphere | ∞ | 0.3 | (1.5231, 55) |
| 13 | Sphere | ∞ | 0 | |

The materials selected in the present embodiment of the disclosure are chosen from readily available components having constant refractive index $n_d$ and Abbe number $v_d$. The six aspheric surfaces are described in Table 2. The present embodiment depicts only one exemplary design. Assuming the aforementioned image lens group 104 remains the same, a curving surface of the liquid zooming unit 102, or the curvature of optical surface 6, can be dynamically modified by automatic control, for example.

TABLE 2

| | Asphere1 | Asphere2 | Asphere3 | Asphere4 | Asphere5 | Asphere6 |
|---|---|---|---|---|---|---|
| Y Radius | 1.828612 | 10.34366 | 11.41561 | −1.17869 | −1.14117 | 6.187793 |
| Conic Constant (K) | 0 | 0 | 0 | −0.55629 | −0.19998 | 0 |
| $4^{th}$ Order Coefficient (A) | 0.037211 | 0.058989 | −0.05014 | 0.016819 | 0.018375 | −0.02992 |
| $6^{th}$ Order Coefficient (B) | 0.04909 | 0.058257 | 0.025849 | 0.032199 | −0.03918 | −0.02164 |
| $8^{th}$ Order Coefficient (C) | −0.02139 | −0.02117 | −0.02525 | −0.02352 | 0.078425 | 0.008531 |
| $10^{th}$ Order Coefficient (D) | 0.170775 | 0.268394 | 0.005043 | 0.009721 | −0.00183 | −0.00047 |
| $12^{th}$ Order Coefficient (E) | | | 0.005332 | −2.45E−05 | −0.00703 | −0.00013 |

Figure 4:
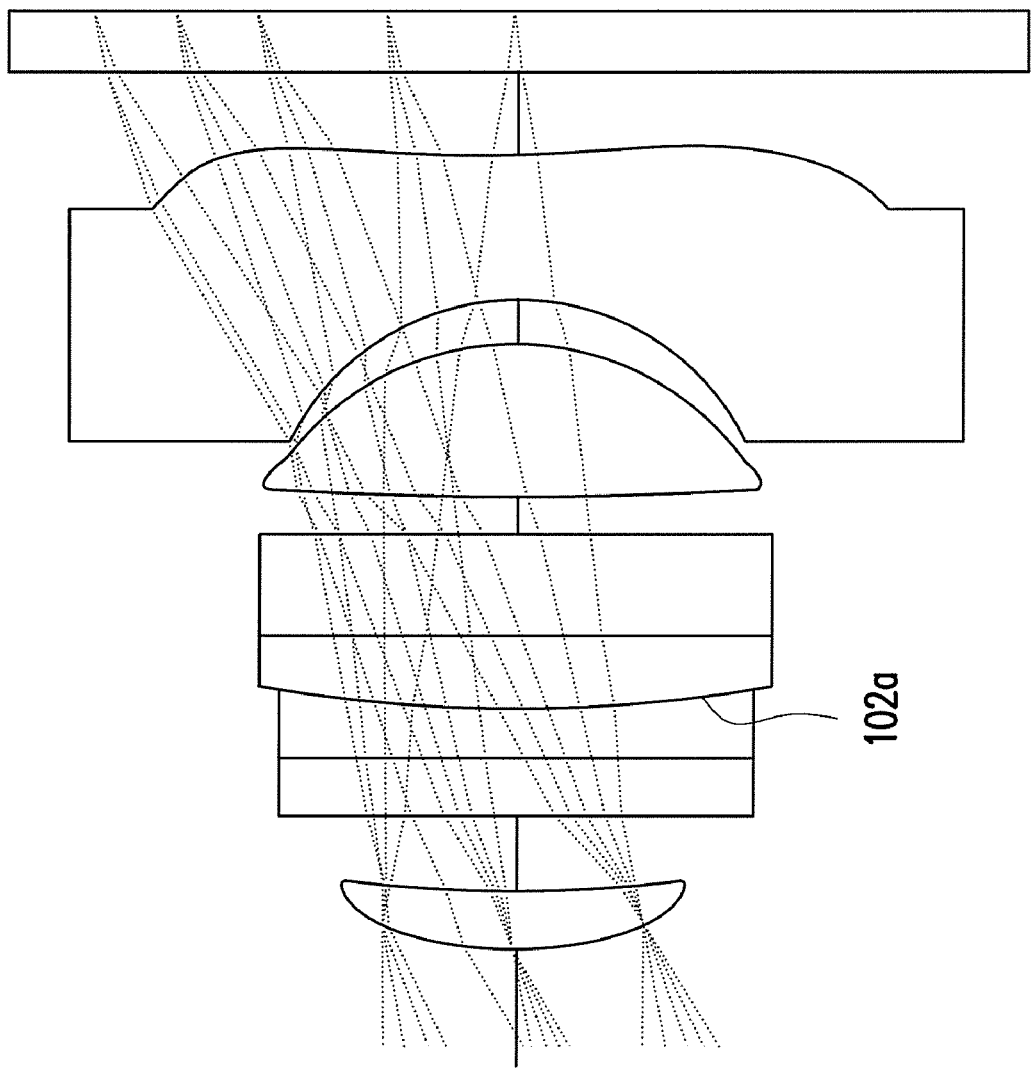
Figure 5:
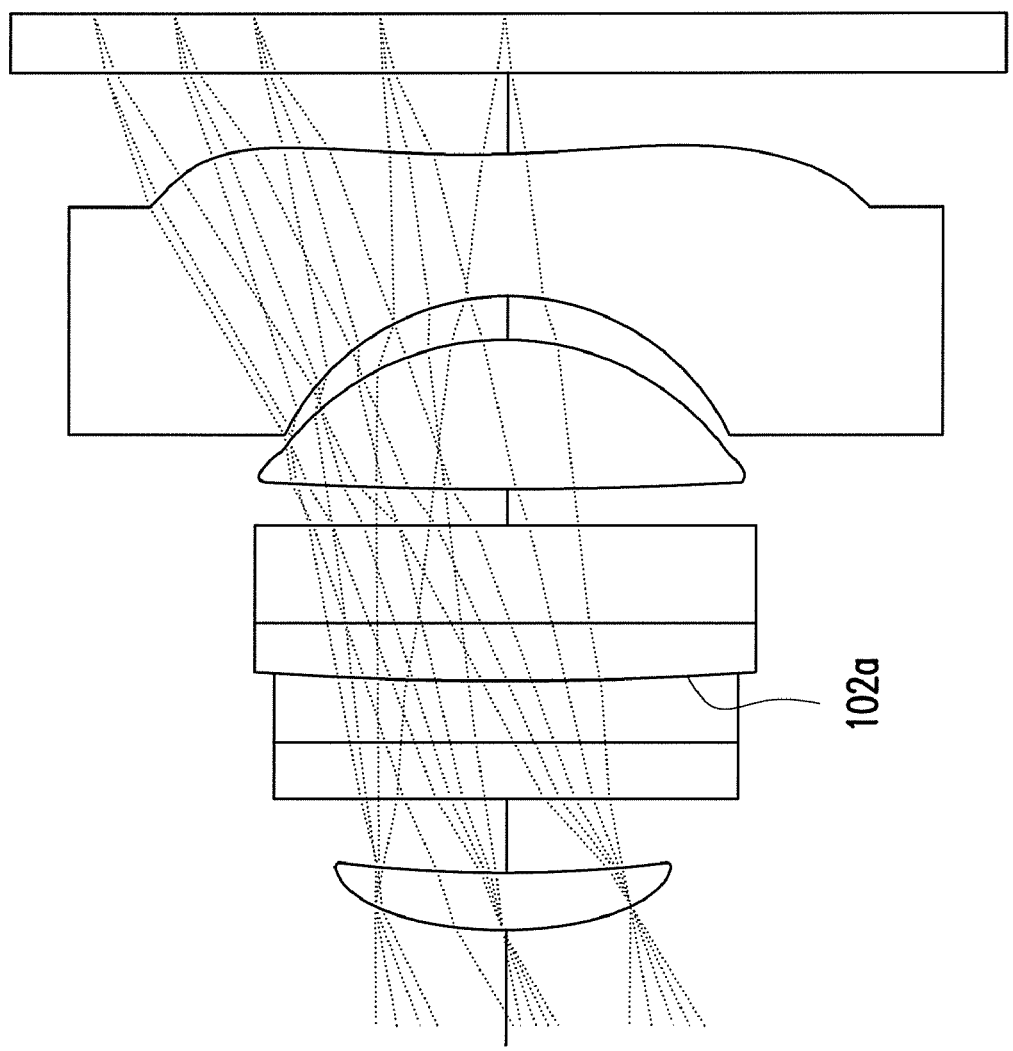
Figure 6:
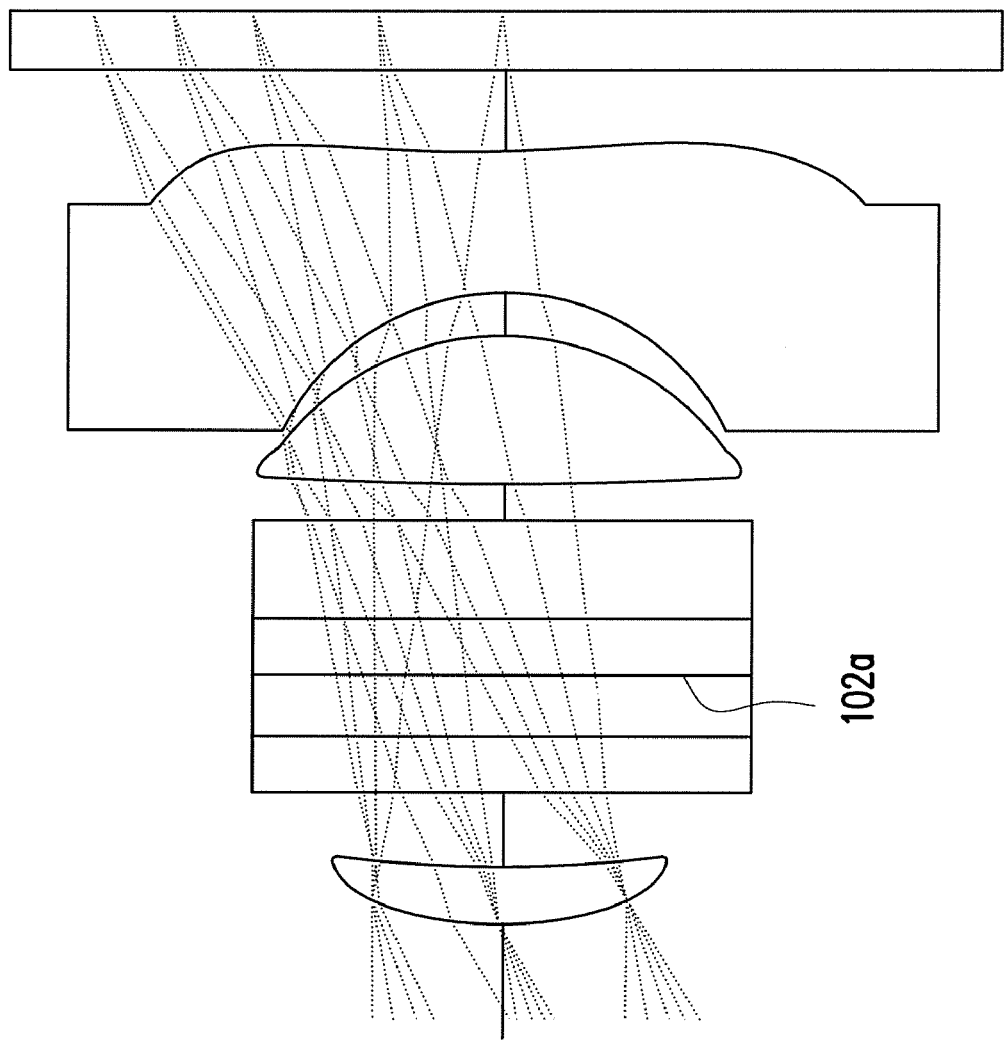
Figure 7:
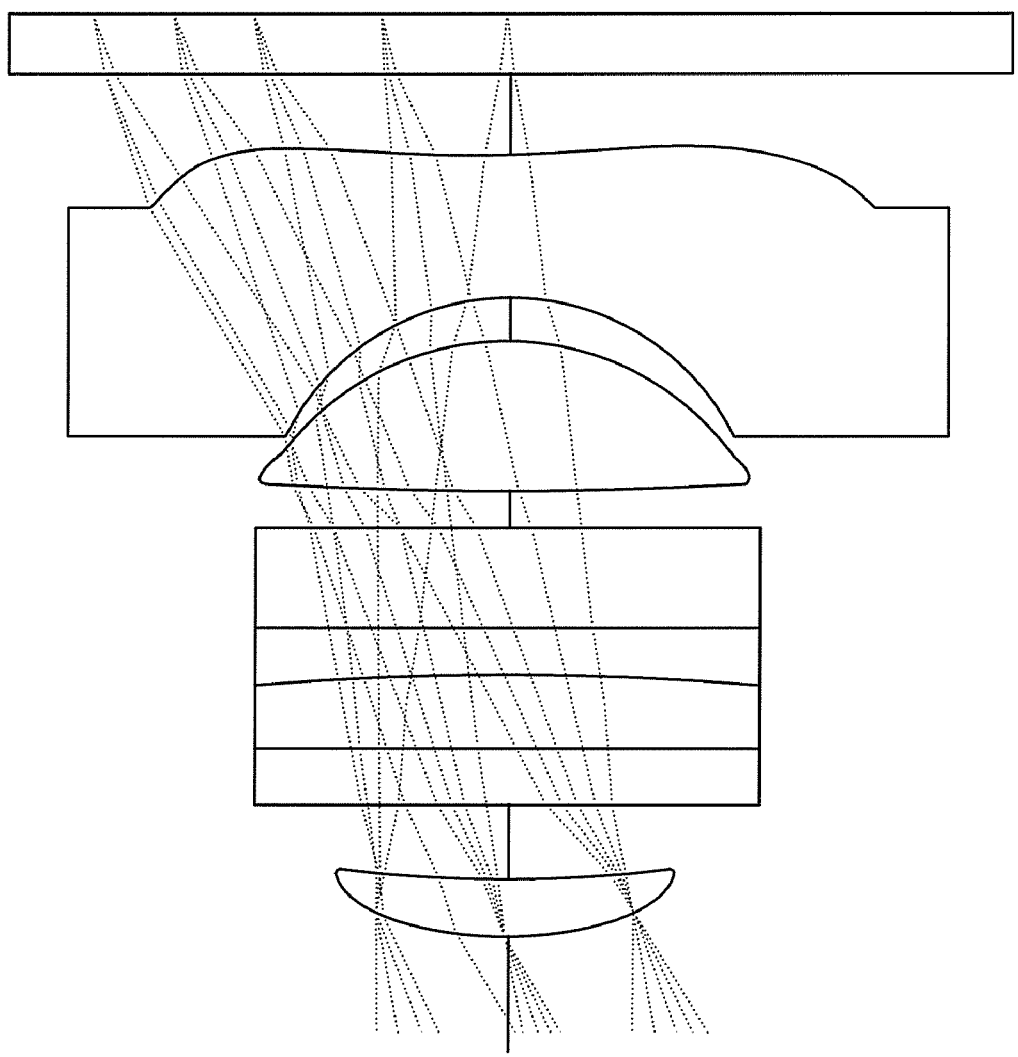
Figure 8:
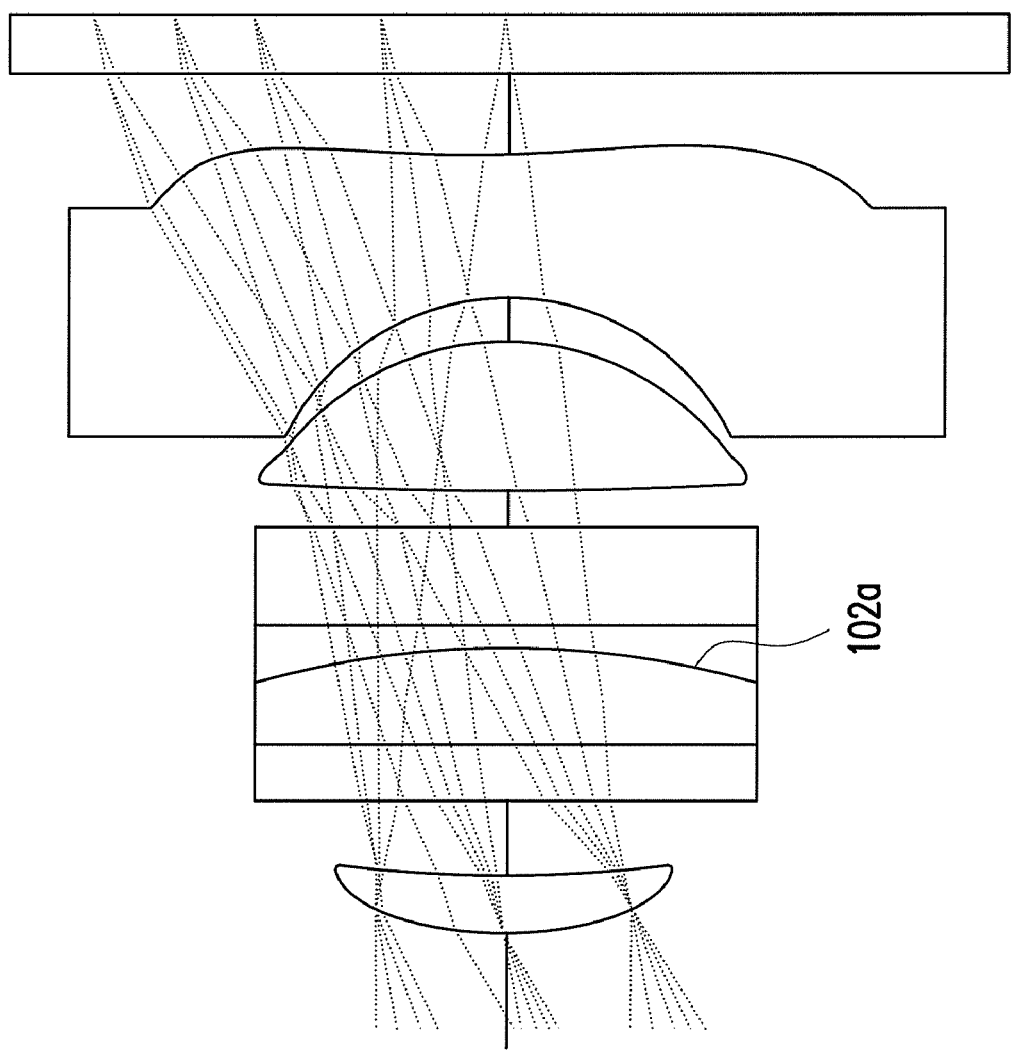
Figure 9:
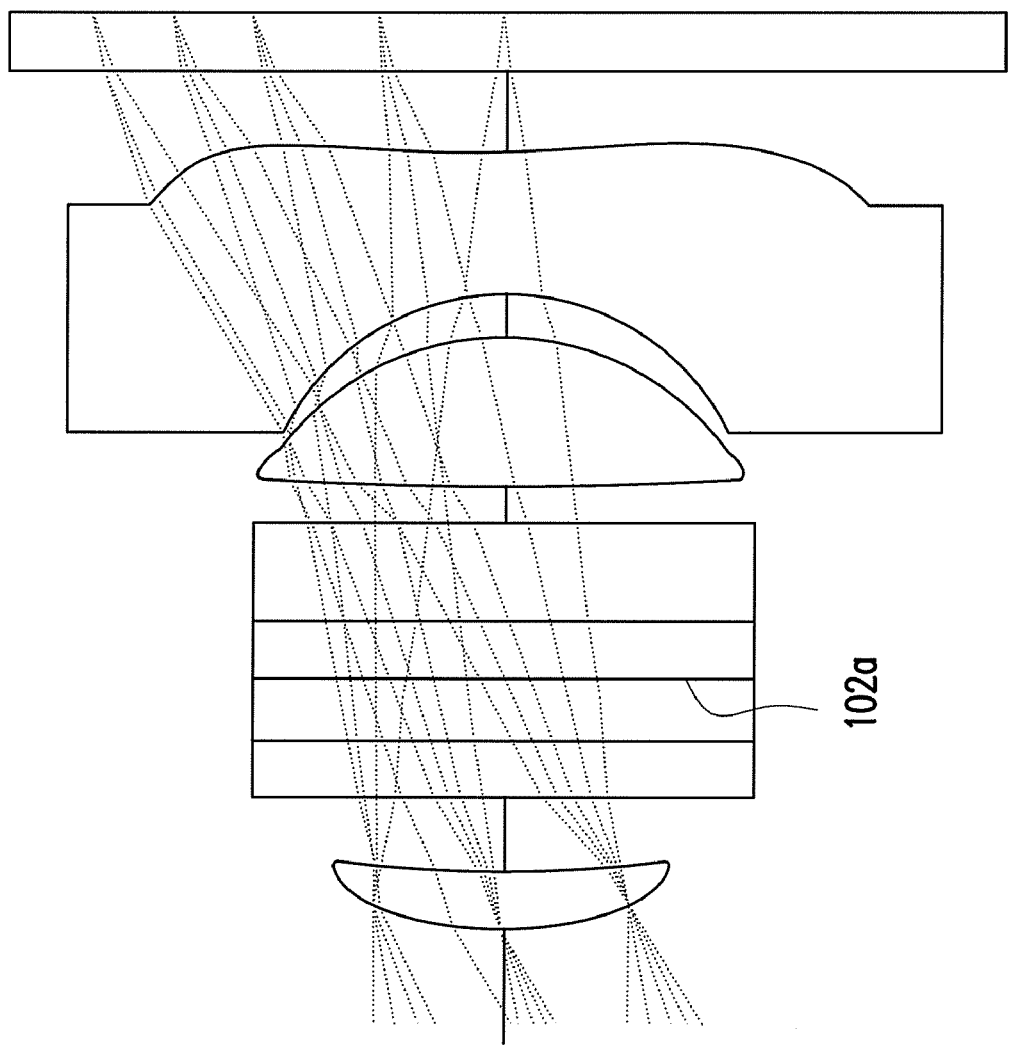
FIGS. 9-16 are schematic diagrams illustrating the zooming mechanism for the auto-focusing lens module in accordance with a plurality of embodiments of the disclosure.
Figure 10:
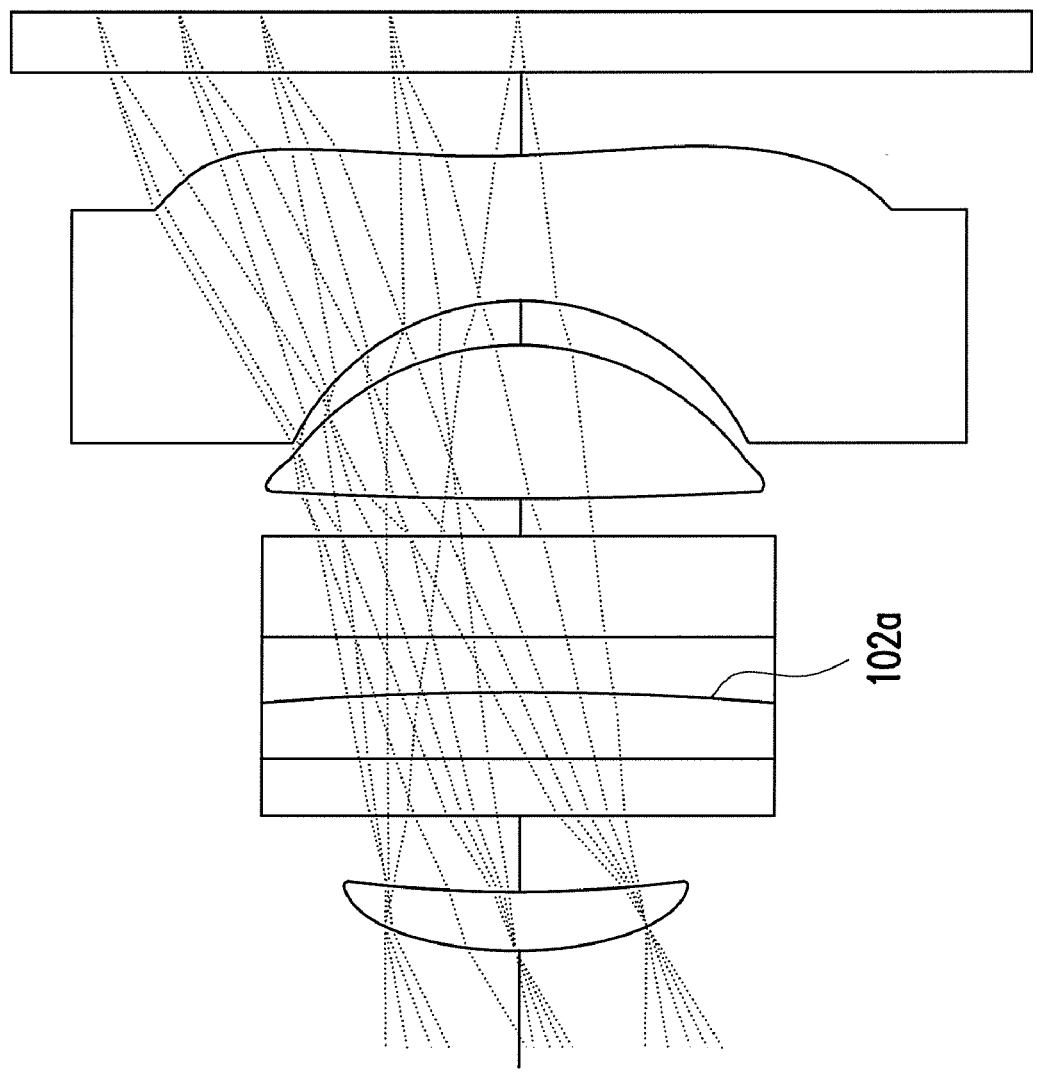
Figure 11:
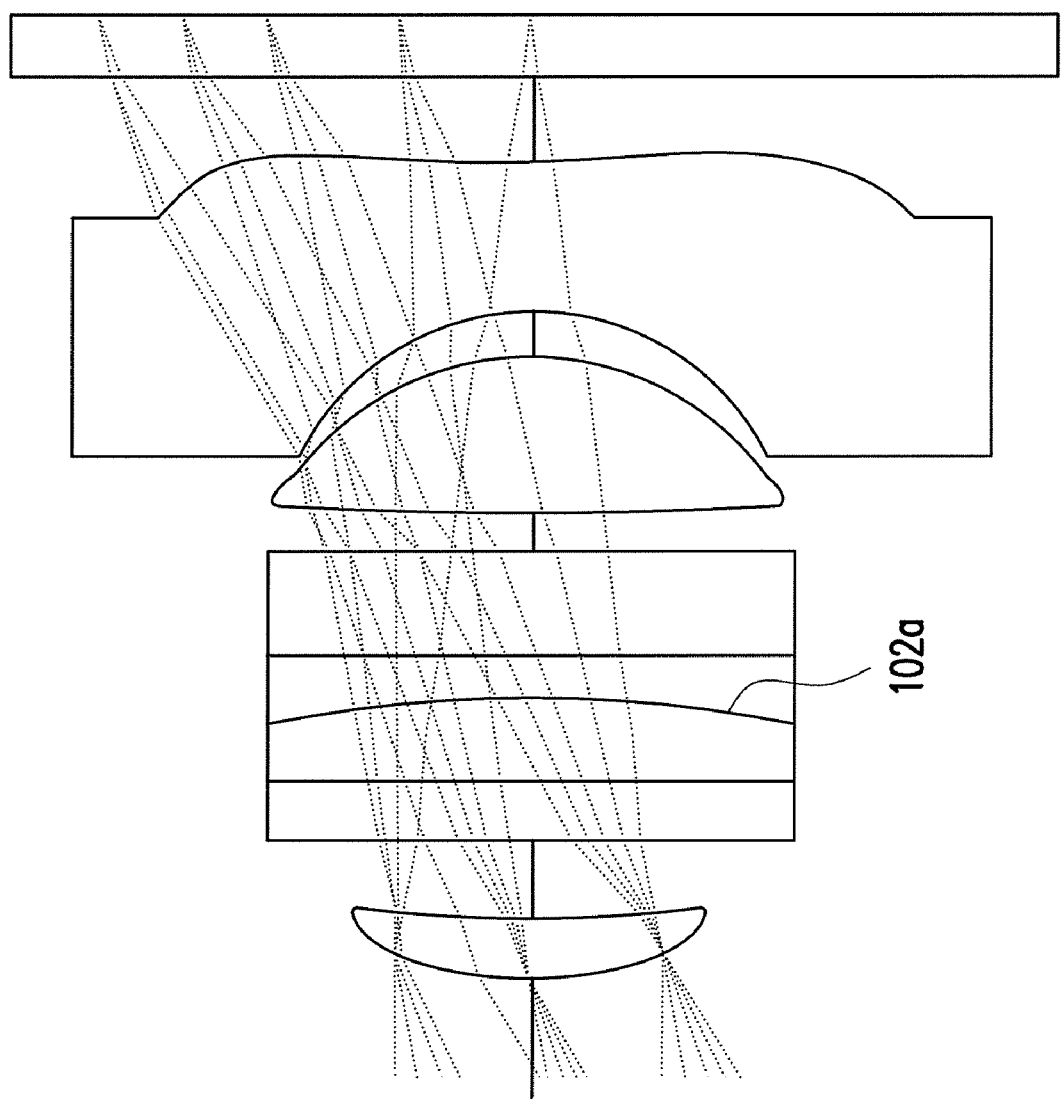
Figure 12:
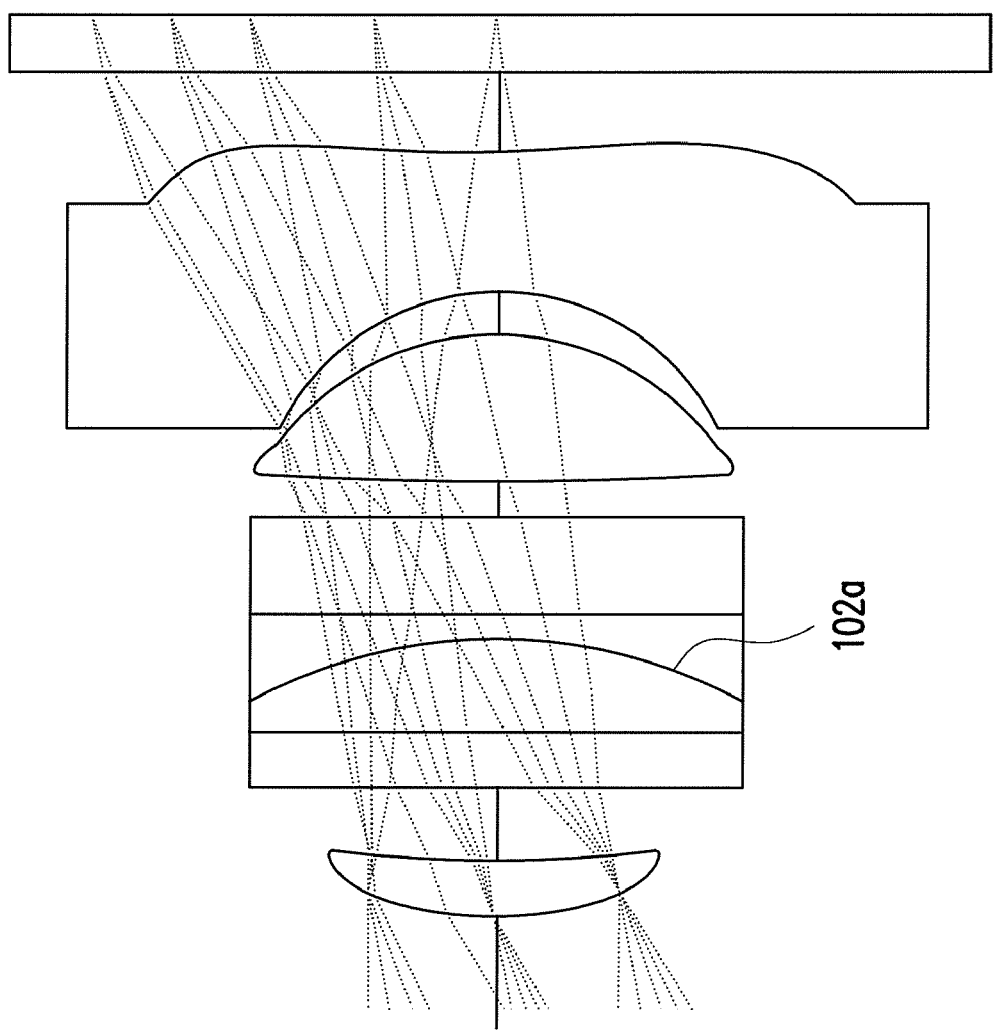
Figure 13:
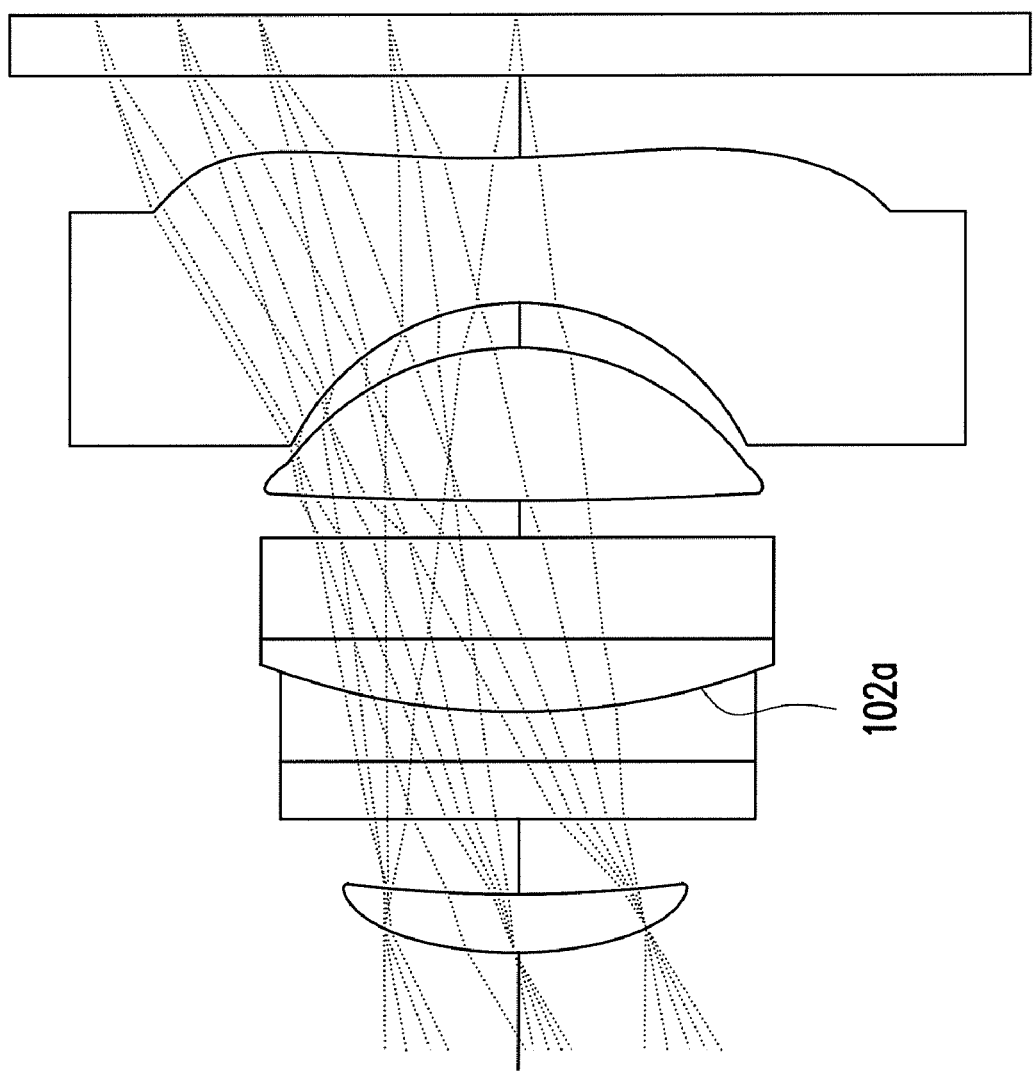
Figure 14:
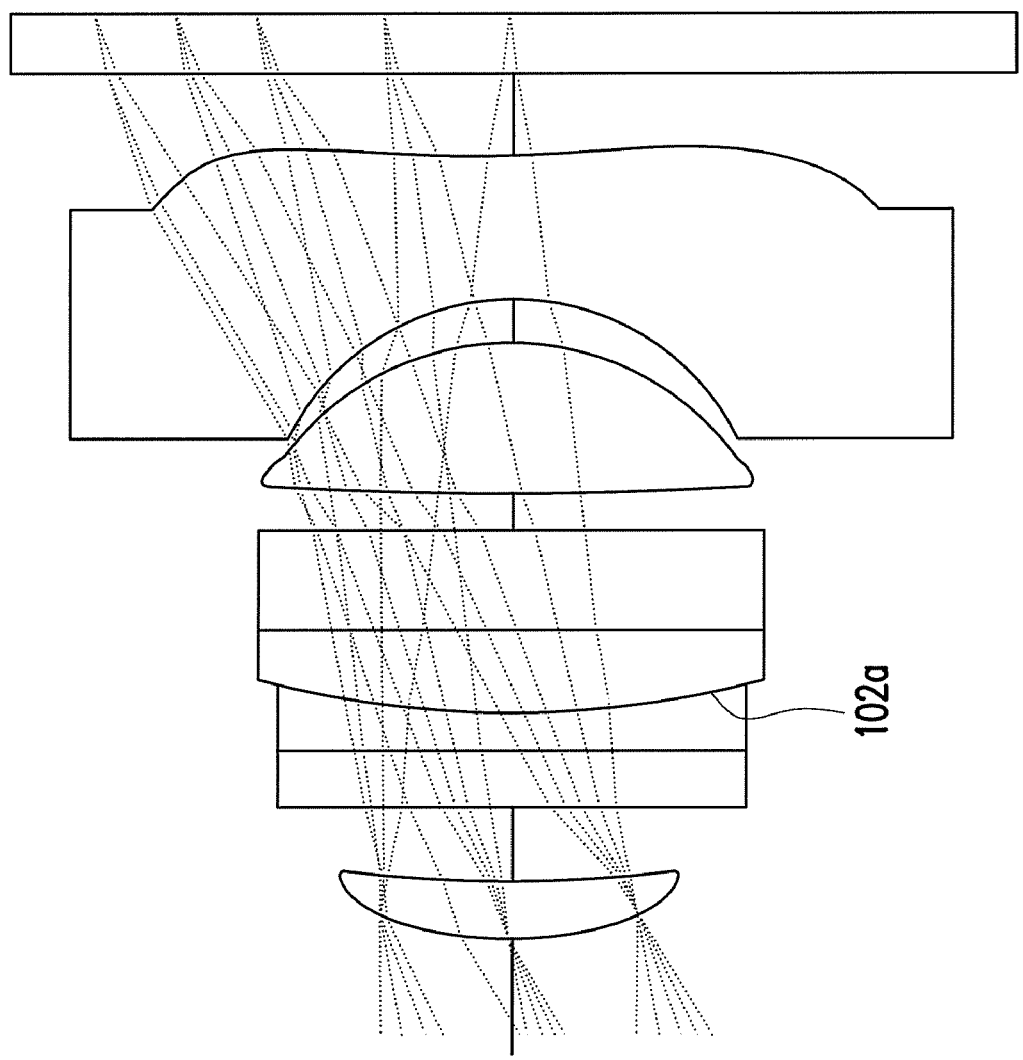
Figure 15:
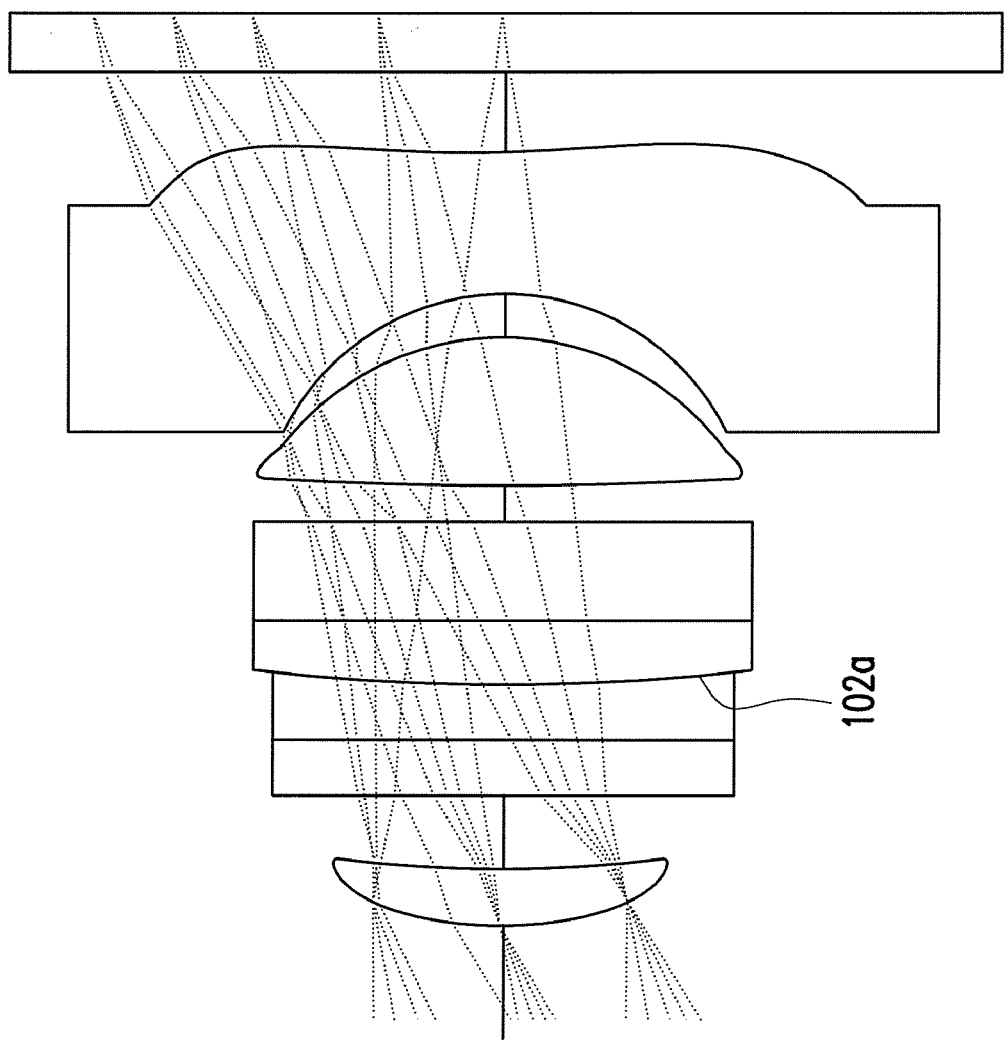
Figure 16:
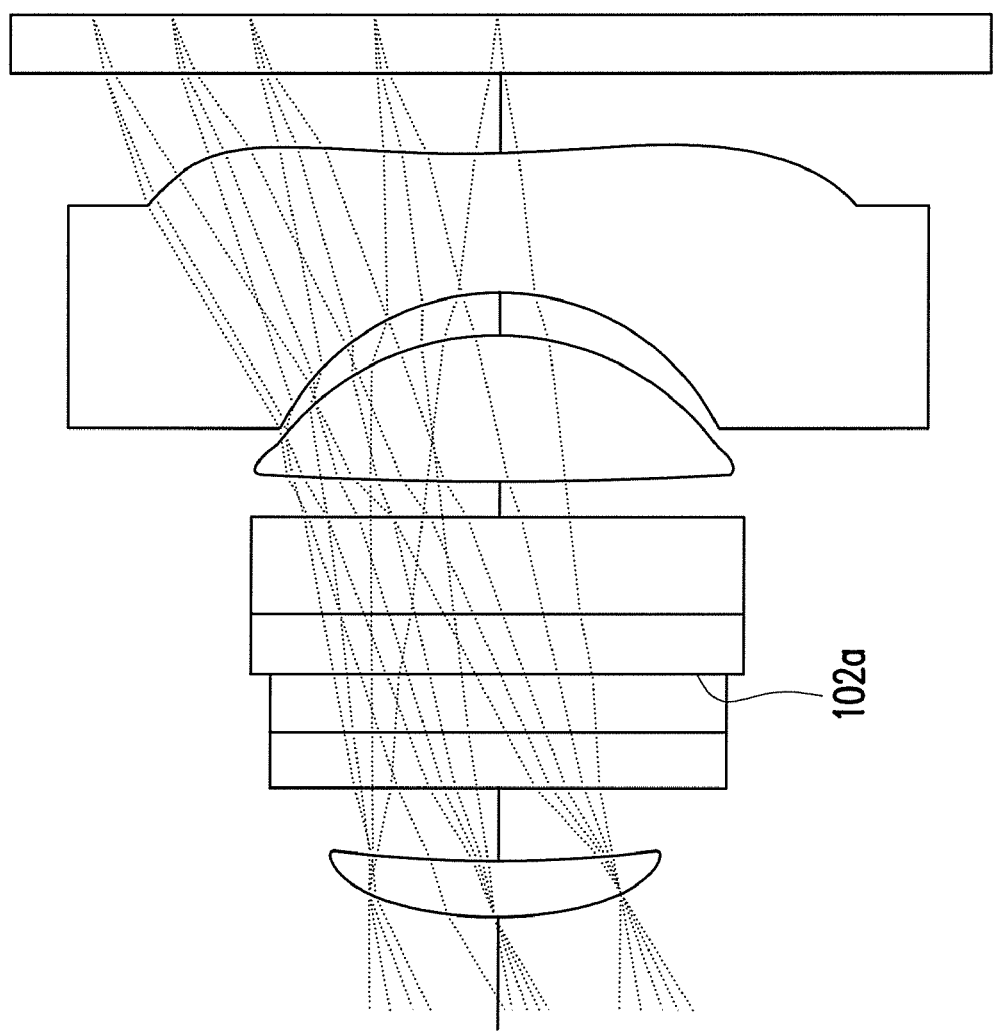

In FIG. 3, the object distance is set at infinity (∞). A curvature change of interface 102a is shown in FIG. 4, in which the object distance is now set at 30 cm. Other examples are shown in FIGS. 5-8, in which the object distance is set at 20, 15, 10, and 5 cm, respectively. Variations of the parameters for the liquid zooming unit 102 can be seen in Table 3. T1 and T2 are the respective thicknesses of the two liquids measured at the center, in which each thickness corresponds to a different radius of curvature. The total thickness of the two liquids is 0.65 mm, for example.

TABLE 3

| Object Distance (mm) | Radius | T1 (mm) | T2 (mm) |
|---|---|---|---|
| ∞ | 8.54 | 0.26 | 0.39 |
| 300 | 16.502078 | 0.29 | 0.36 |
| 200 | 33.377789 | 0.31 | 0.34 |
| 150 | −1184.322 | 0.32 | 0.33 |
| 100 | −15.43464 | 0.36 | 0.29 |
| 50 | −3.625074 | 0.46 | 0.19 |

After optimization of the Modulation Transfer Function (MTF), a MTF analysis has shown substantially good results. Numerical data from the MTF analysis is not listed herein. The above-described design parameters only form an exemplary embodiment of the disclosure, and other design parameters can be implemented. The aforementioned liquid zooming unit 102 is designed to control a back and forth bending of the interface 102a, in which initially, the interface 102a bends to the left.

By selecting particular types of liquids, embodiments of the disclosure can influence how interface 102a bends towards the image sensor 110 from a near-planar orientation. Accordingly, using different types of liquids may necessitate changing where the image sensor 110 and the object lens 100 are disposed. FIGS. 9-12 are schematic diagrams illustrating the zooming mechanism for the auto-focusing lens module in accordance with a plurality of embodiments of the disclosure. In FIGS. 9-12, interface 102a starts from a planar orientation, then bends towards the image sensor 110. The corresponding object distances for FIGS. 9-12 are respectively set at ∞, 15 cm, 10 cm, and 5 cm.

In FIGS. 13-16, interface 102a starts from a planar orientation then bends away from the image sensor 110. The corresponding object distances for FIGS. 13-16 are respectively set at ∞, 15 cm, 10 cm, and 5 cm.

Figure 17:
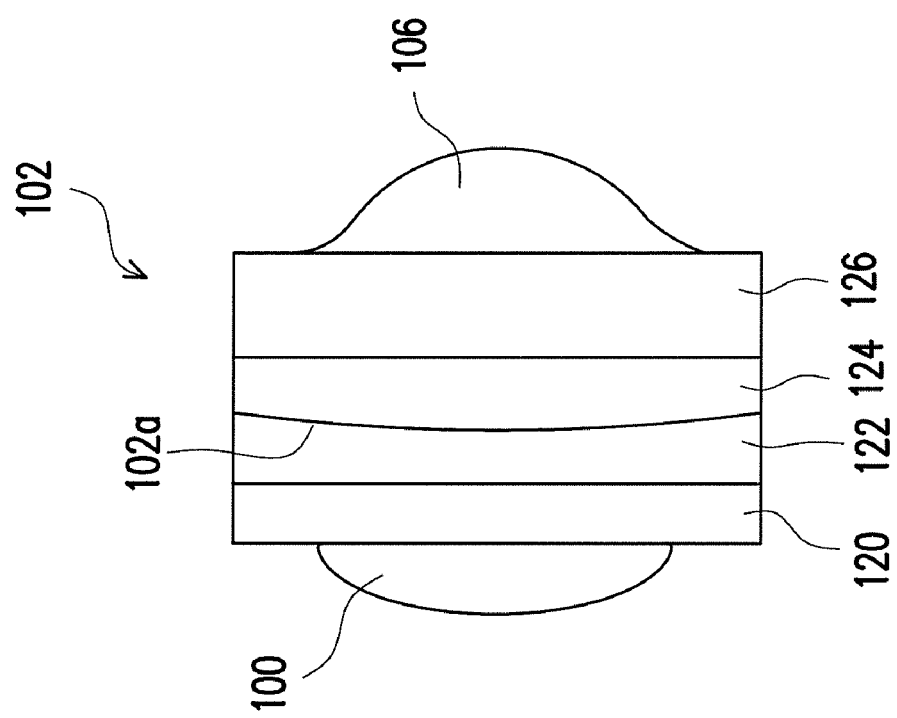
FIG. 17 is a cross-sectional schematic diagram illustrating an integrated liquid zooming unit 102 in accordance with one embodiment of the disclosure.

With current optical component manufacturing and assembling capabilities, the object lens 100, the first lens 106, and the liquid zooming unit 102 can be integrated into a single unit. FIG. 17 is a cross-sectional schematic diagram illustrating an integrated liquid zooming unit 102 in accordance with one embodiment of the disclosure. Referring to FIG. 17, since the light transmissive substrates 120 and 126 are also comprised of optical materials, these two substrates can each be respectively integrated with the object lens 100 and the first lens 106. In order to integrate the light transmissive substrate 120 and the object lens 100, the object lens 100 can be attached to the light transmissive substrate 120, for example, or the object lens 100 can be directly formed on the light transmissive substrate 120. In order to integrate the light transmissive substrate 126 and the first lens 106, the first lens 106 can be attached to the light transmissive substrate 126, for example, or the first lens 106 can be directly formed on the light transmissive substrate 126. Furthermore, instead of integrating both light transmissive substrates, in another embodiment of the disclosure, only one light transmissive substrate is selected for integration. It should be noted that other integration techniques are within the spirit and scope of the disclosure.

Figure 18:
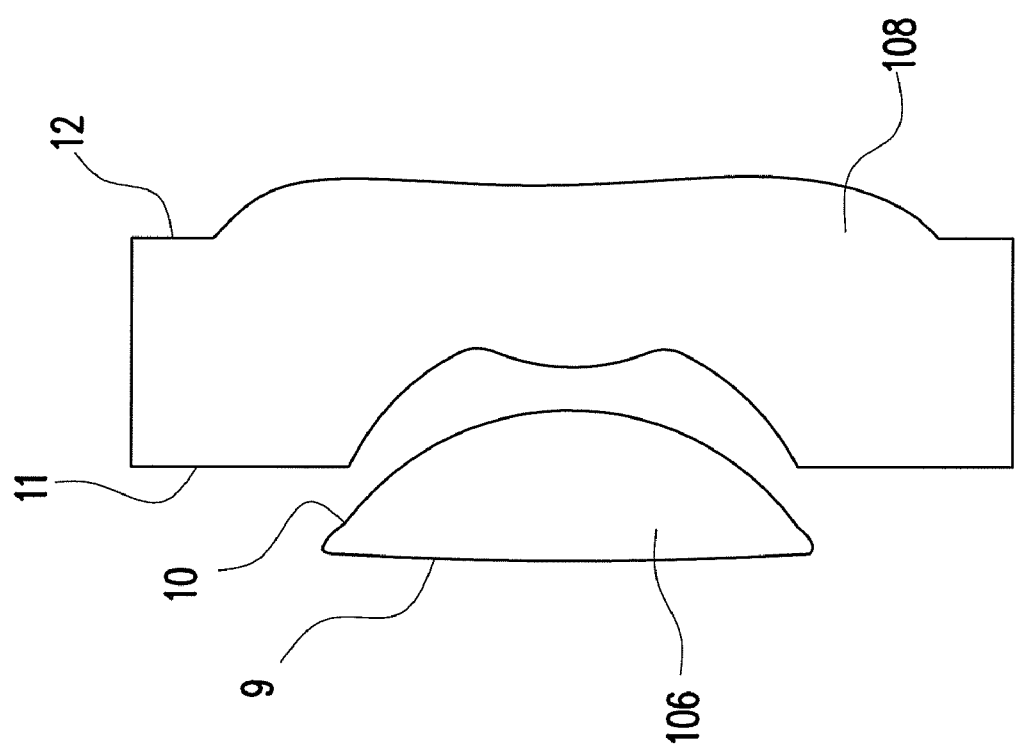
FIGS. 18-19 are schematic diagrams illustrating modifications to an image lens group 104 in accordance with some embodiments of the disclosure.
Figure 19:
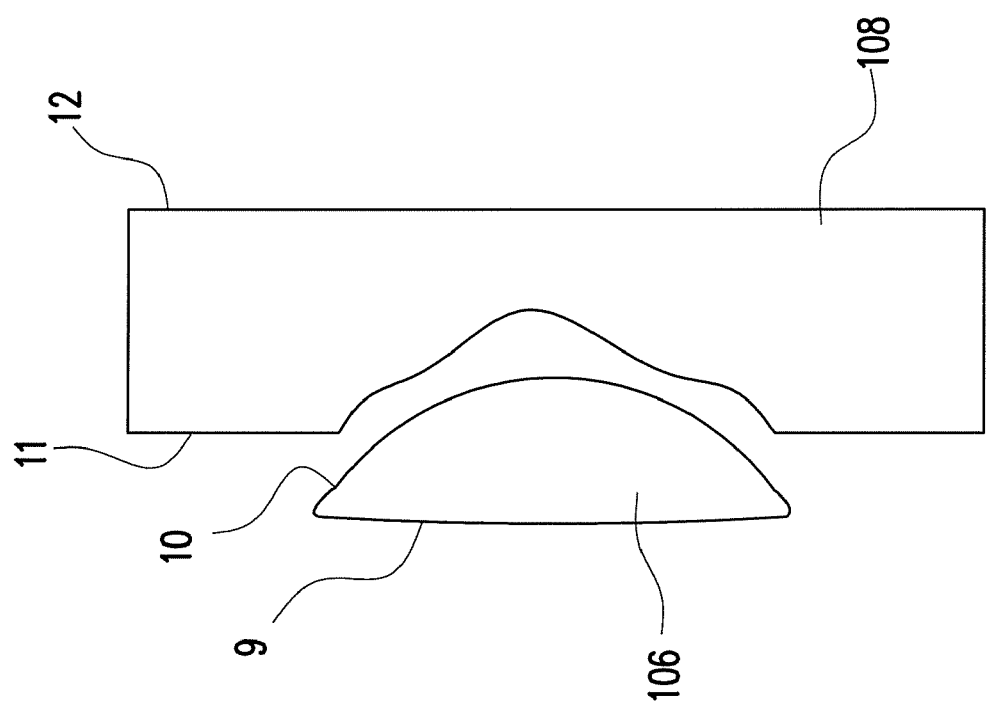

FIGS. 18-19 are schematic diagrams illustrating modifications to the image lens group 104 in accordance with a plurality of embodiments of the disclosure. Referring to FIG. 18, in addition to the concave curving surface of the optical surface 11 for the second lens 108, there can be a secondary curving surface such as a convex curving surface bending away from the primary concave direction, thereby compensating for image distortion. Another embodiment of the disclosure can provide another type of secondary curving surface, such as one illustrated in FIG. 19. The secondary curving surface of optical surface 11 is bending further into the primary concave direction. Another embodiment of the disclosure can provide a planar optical surface 12. Moreover, optical surfaces 9 and 10 can also have designs of secondary curving surfaces.

In other words, according to practical designs of the lens group, the first lens 106 and the second lens 108 can have secondary curving surfaces. However, it should be noted that optical surface 10 has the convex curving surface, and optical surface 11 has the concave curving surface adapted to a portion of optical surface 10.

In embodiments of the disclosure, a liquid lens is implemented in an auto-focusing lens module according to an optical design for module miniaturization, in which the range of object distances is increased from infinity to 5 cm while clear picture quality is maintained in close-ups. Moreover, the auto-focusing lens module has an auto-focus speed of less than 100 ms, and the module is more reliable and more resistant to drop impact because of the lack of moving components. In addition, assembling the module is easier, and no back focal adjustments are needed.

In light of the above design principles, if the stop position is also considered, higher image quality can be achieved by modifying the optical design. Accordingly, the liquid zooming unit can utilize lower precision component manufacturing, thereby reducing costs.

Figure 20:
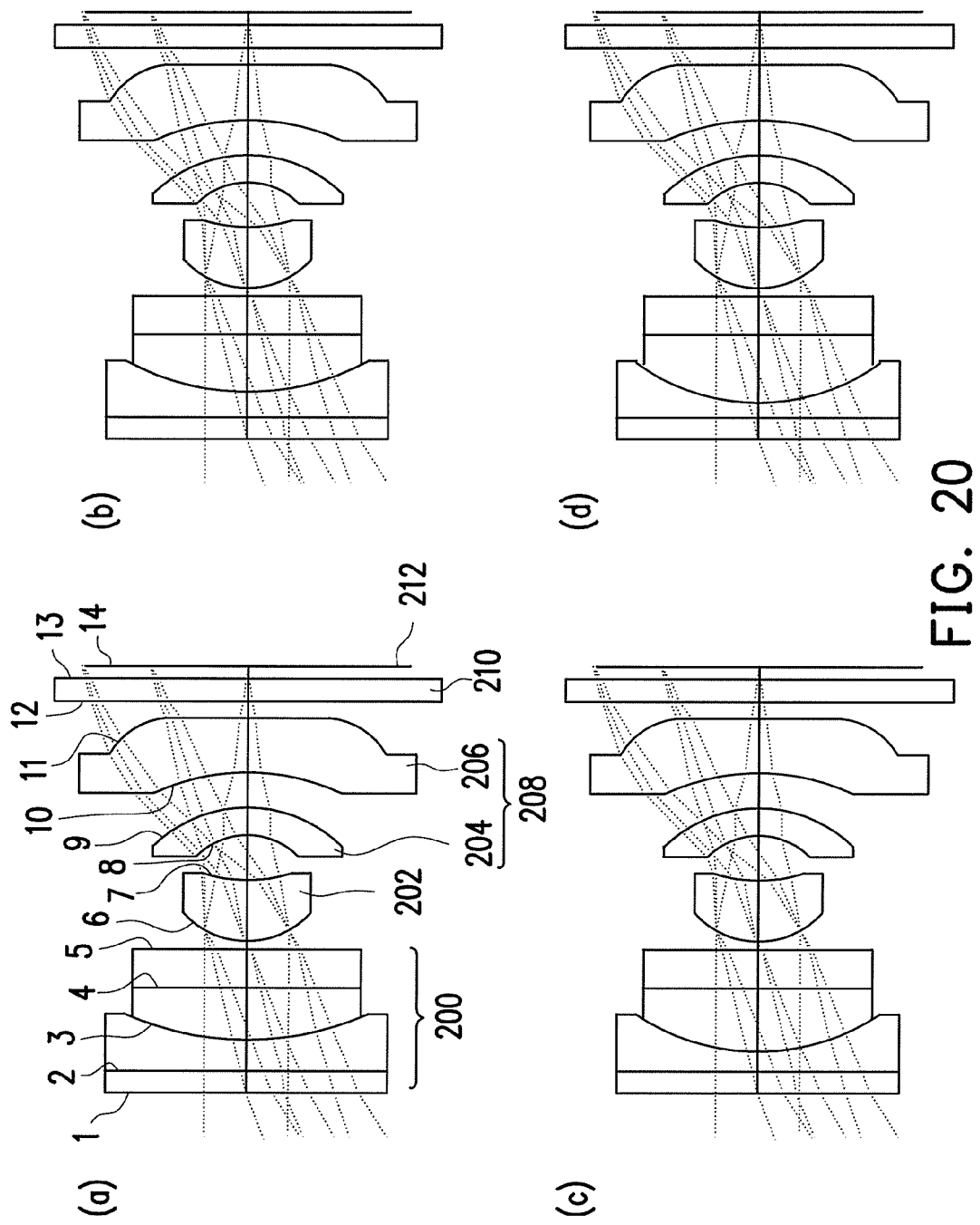
FIGS. 20-22 are cross-sectional schematic diagrams illustrating a plurality of auto-focusing lens modules having different stop locations in accordance with a plurality of embodiments of the disclosure.
Figure 21:
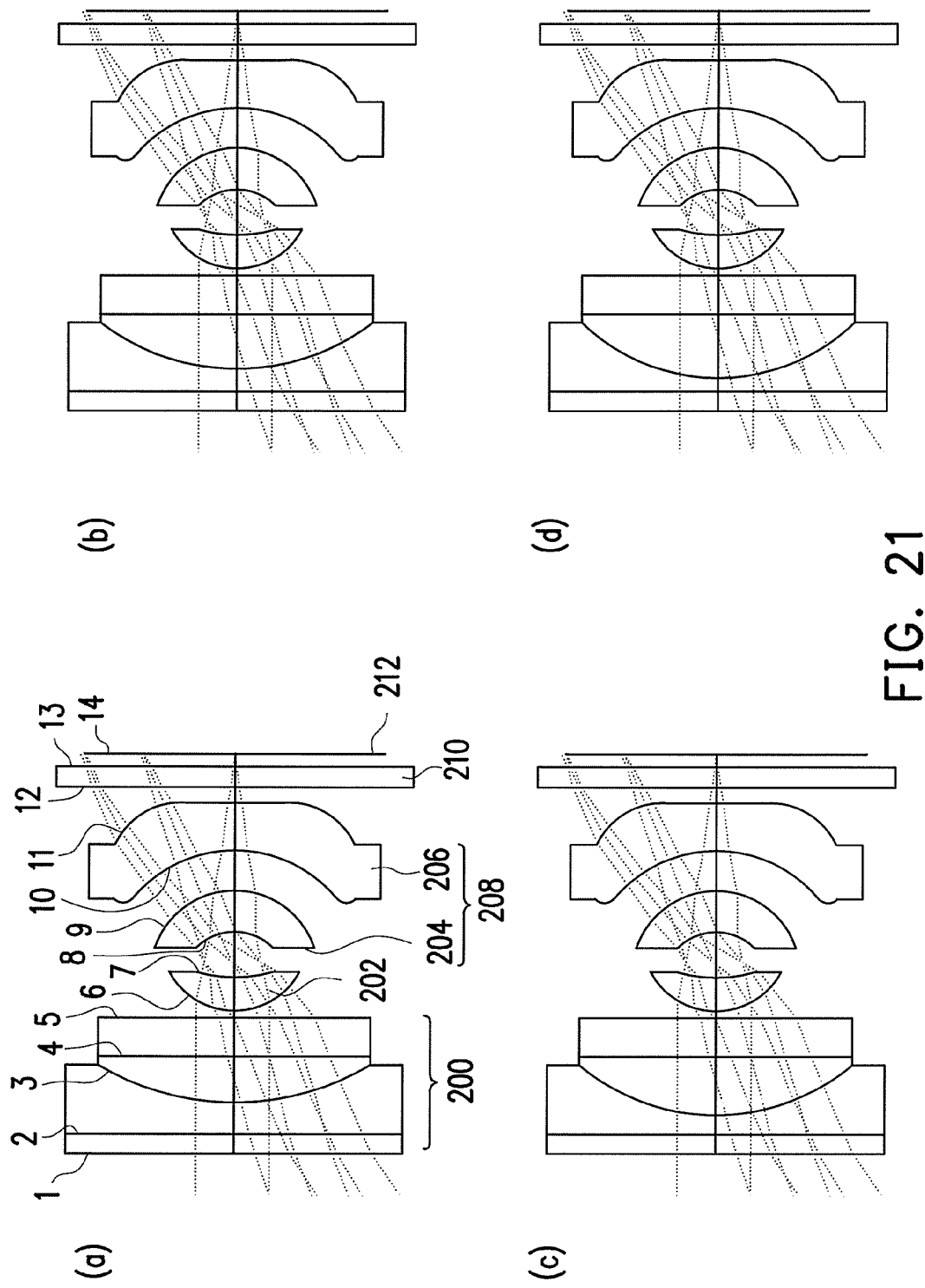
Figure 22:
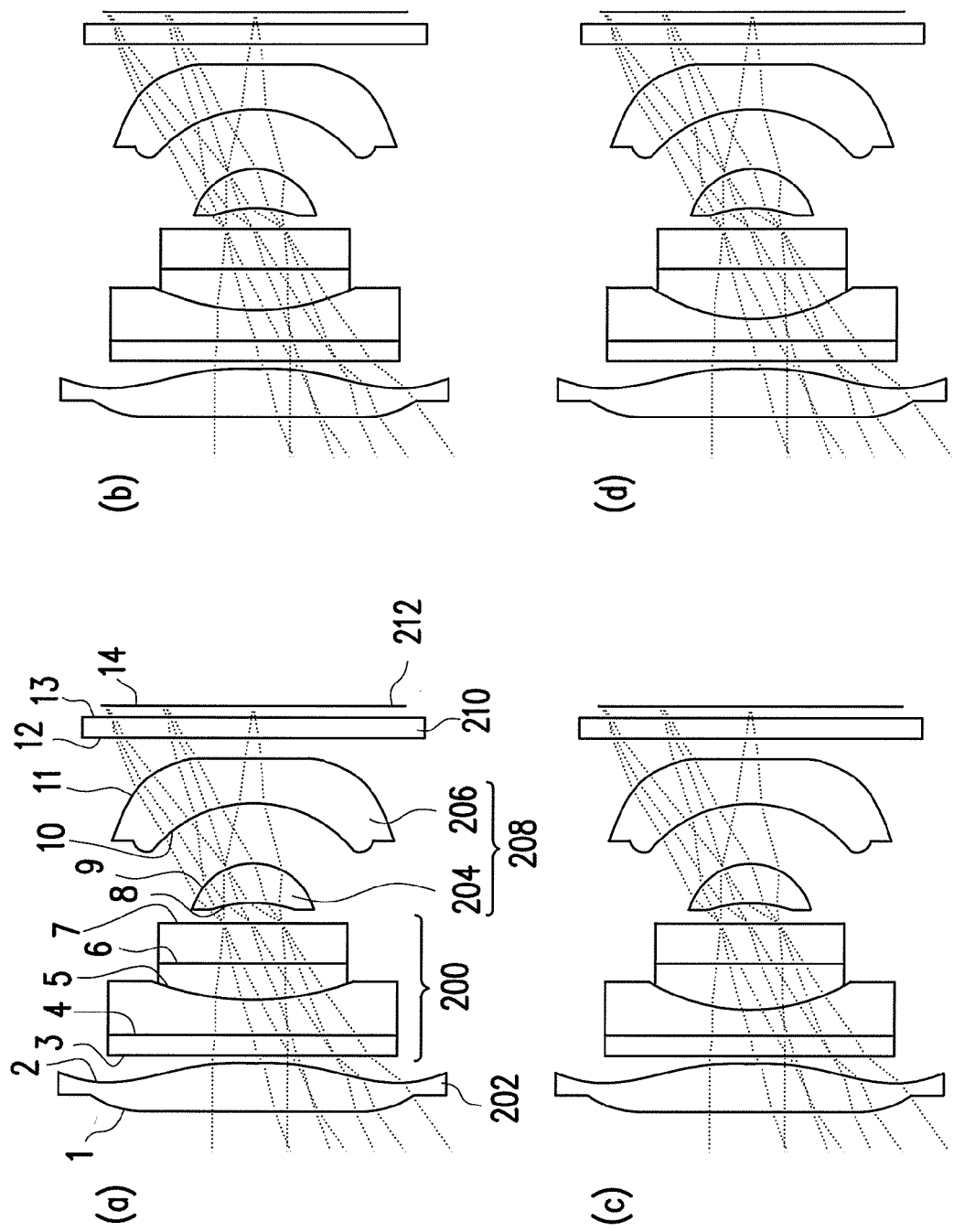

FIGS. 20-22 are cross-sectional schematic diagrams illustrating a plurality of auto-focusing lens modules having different stop locations in accordance with a plurality of embodiments of the disclosure.

Referring to FIG. 20(a), the liquid zooming unit 200 is disposed in front to directly receive the incident light from the image. Lens 202 near the object is disposed behind liquid zooming unit 200, and the stop is disposed on a front surface of lens 202, namely on optical surface 7. The dotted lines schematically show the light path through the auto-focusing lens module. The image lens group 208 includes lens 204 and 206, and both lenses are disposed behind lens 202. The image sensor 210 is disposed behind the image lens group 208. The sensor array 212 of the image sensor 210 is disposed on an image plane denoted by optical surface 14, in which optical surface 14 is disposed behind image sensor 210 which can be a planar panel.

As shown in FIG. 20(a), there are 14 optical surfaces from the liquid zooming unit 200 to the image sensor 210. In the embodiment depicted in FIG. 20(a), object image is set to infinity by the liquid zooming unit 200. According to changes in the liquid zooming unit 200, the object distances for the embodiments depicted in FIGS. 20(b) to 20(d) are respectively set to 9 cm, 7 cm, and 5 cm. Table 4 lists the settings for optical surfaces 1-13 which can depict an embodiment of the disclosure. The stop can be disposed, for example, on optical surface 6 of lens 202. The structure for the aspheric surfaces listed in Table 4 is laid out in Table 5. Table 6 lists the parameter variations corresponding to object distance changes of the liquid zooming unit 200.

TABLE 4

| Optical Surface | | Radius of Curvature (mm) | Thickness (mm) | Material ($n_d$, $v_d$) |
|---|---|---|---|---|
| 1 | Sphere | ∞ | 0.3 | (1.5231, 55) |
| 2 | Sphere | ∞ | 0.4539 * T1 | (1.489, 38.4) |
| 3 | Sphere | 4.3 * Radius | 0.6961 * T2 | (1.4, 58.7) |
| 4 | Sphere | ∞ | 0.55 | (1.5231, 55) |
| 5 | Sphere | ∞ | 0.1 | |
| 6 Stop | Asphere1 | 1.131431469 | 0.816131587 | (1.531, 56) |
| 7 | Asphere2 | 2.344370977 | 0.598069154 | |
| 8 | Asphere3 | −1.726624021 | 0.397624292 | (1.607, 27) |
| 9 | Asphere4 | −1.243487784 | 0.472432651 | |
| 10 | Asphere5 | −2.051884336 | 0.765742315 | (1.531, 56) |
| 11 | Asphere6 | 11.8 | 0.25 | |
| 12 | Sphere | ∞ | 0.3 | (1.5231, 55) |
| 13 | Sphere | ∞ | 0.2 | |

TABLE 5

|  | Asphere1 | Asphere2 | Asphere3 | Asphere4 | Asphere5 | Asphere6 |
|---|---|---|---|---|---|---|
| Y Radius | 1.1224855 | 2.49543 | −1.71792 | −1.26108 | −2.21904 | 5.73416808 |
| Conic Constant (K) | −0.005388 | −0.13503 | 4.56228 | −1.11592 | −0.01581 | −3 |
| $4^{th}$ Order Coefficient (A) | 0.0069027 | 0.07924 | 0.01878 | 0.06481 | 0.067323 | −0.0308576 |
| $6^{th}$ Order Coefficient (B) | 0.0014139 | −0.01643 | 0.08636 | 0.02228 | −0.00036 | 0.0003834 |
| $8^{th}$ Order Coefficient (C) | 0.0126833 | 0.06228 | −0.06952 | 0.00868 | −7.70E−05 | −0.0009177 |
| $10^{th}$ Order Coefficient (D) | 0.0244935 | −0.06866 | 0.03739 | −0.00352 | −0.00012 | 5.9E−05 |

TABLE 6

| Object Distance (mm) | Radius | T1 (mm) | T2 (mm) |
|---|---|---|---|
| ∞ | 4.3 | 0.4539 | 0.6961 |
| 250 | 3.904879 | 0.41529 | 0.73471 |
| 150 | 3.525772 | 0.37184 | 0.77816 |
| 90 | 3.010375 | 0.29803 | 0.85197 |
| 70 | 2.729971 | 0.24857 | 0.90143 |
| 50 | 2.358442 | 0.16335 | 0.98665 |

Referring to FIG. 21, the stop for the present embodiment of the disclosure is also disposed behind the liquid zooming unit 200. However, adjustments are made to lens 202, along with the curving surfaces of lenses 204 and 206, the two lenses 204 and 206 forming the image lens group 208. FIGS. 21(a) to 21(d) respectively set the object distances at ∞, 9 cm, 7 cm, and 5 cm, for example. The settings for optical surfaces 1-13 are listed in Table 7. The stop can be disposed, for example, on optical surface 8 of lens 204. The structure for the aspheric surfaces listed in Table 7 is laid out in Table 8. Table 9 lists the parameter variations corresponding to object distance changes of the liquid zooming unit 200.

TABLE 7

| Optical Surface | | Radius of Curvature (mm) | Thickness (mm) | Material $(n_d, v_d)$ |
|---|---|---|---|---|
| 1 | Sphere | ∞ | 0.3 | (1.5231, 55) |
| 2 | Sphere | ∞ | 0.4539 * T1 | (1.489, 38.4) |
| 3 | Sphere | 4.3 * Radius | 0.6961 * T2 | (1.4, 58.7) |
| 4 | Sphere | ∞ | 0.55 | (1.5231, 55) |
| 5 | Sphere | ∞ | 0.1 | |
| 6 | Asphere1 | 1.10 | 0.517057453 | (1.531, 56) |
| 7 | Asphere2 | 2.89685469 | 0.207064433 | |
| 8 Stop | Sphere | ∞ | 0.419633864 | |
| 9 | Asphere3 | −1.531715594 | 1.07986523 | (1.607, 27) |
| 10 | Asphere4 | −1.168512512 | 0.548918896 | |
| 11 | Asphere5 | −2.033538917 | 0.697093988 | (1.531, 56) |
| 12 | Asphere6 | 21.7440914 | 0.25 | |
| 13 | Sphere | ∞ | 0.3 | (1.5231, 55) |
| 14 | Sphere | ∞ | 0.2 | |

TABLE 8

|  | Asphere1 | Asphere2 | Asphere3 | Asphere4 | Asphere5 | Asphere6 |
|---|---|---|---|---|---|---|
| Y Radius | 1.1012451 | 2.877 | −1.54276 | −1.16547 | −2.08866 | 12.1404011 |
| Conic Constant (K) | 0.0015261 | 0.14206 | 5.06282 | −0.16976 | −0.0054 | −3 |
| $4^{th}$ Order Coefficient (A) | 0.004248 | −0.01677 | −0.13073 | −0.04548 | −0.09913 | −0.0481922 |
| $6^{th}$ Order Coefficient (B) | 0.0060696 | 0.00349 | 0.03298 | −0.01028 | 0.042194 | −0.0044713 |
| $8^{th}$ Order Coefficient (C) | 0.0045468 | 0.00684 | −0.04823 | −0.00794 | 1.24E−05 | 0.00028369 |
| $10^{th}$ Order Coefficient (D) | −0.000702 | 0.00081 | −0.41716 | −0.00204 | −0.00024 | −1.07E−05 |

TABLE 9

| Object Distance (mm) | Radius | T1 (mm) | T2 (mm) |
|---|---|---|---|
| ∞ | 4.3 | 0.4539 | 0.6961 |
| 250 | 3.904879 | 0.41529 | 0.73471 |
| 150 | 3.525772 | 0.37184 | 0.77816 |
| 90 | 3.010375 | 0.29803 | 0.85197 |
| 70 | 2.729971 | 0.24857 | 0.90143 |
| 50 | 2.358442 | 0.16335 | 0.98665 |

Referring to FIG. 22, the stop for the present embodiment of the disclosure is also disposed behind the liquid zooming unit 200. However, adjustments are made to lens 202, along with the curving surfaces of lenses 204 and 206 from the image lens group 208. Lens 202 is disposed in front of the liquid zooming unit 200. FIGS. 22(a) to 22(d) have respective object distances set at ∞, 9 cm, 7 cm, and 5 cm, respectively. The settings for optical surfaces 1-13 are listed in Table 10. The stop can be disposed on optical surface 7 of the liquid zooming unit 200, for example. The structure of the aspheric surfaces listed in Table 10 is laid out in Table 11. Table 12 lists the parameter variations corresponding to object distance changes of the liquid zooming unit 200.

TABLE 10

| Optical Surface | | Radius of Curvature (mm) | Thickness (mm) | Material ($n_d$, $v_d$) |
|---|---|---|---|---|
| 1 | Asphere1 | −199.030932 | 0.703320989 | (1.531, 56) |
| 2 | Asphere2 | −3.769954529 | 0.1 | |
| 3 | Sphere | ∞ | 0.3 | (1.5231, 55) |
| 4 | Sphere | ∞ | 0.5065 * T1 | (1.489, 38.4) |
| 5 | Sphere | 4.288 * Radius | 0.55 * T2 | (1.4, 58.7) |
| 6 | Sphere | ∞ | 0.55 | (1.5231, 55) |
| 7 Stop | Sphere | ∞ | 0.335564096 | |
| 8 | Asphere3 | −2.795563075 | 0.552085135 | (1.607, 27) |
| 9 | Asphere4 | −0.968447691 | 0.875603883 | |
| 10 | Asphere5 | −1.920050763 | 0.676925897 | (1.531, 56) |
| 11 | Asphere6 | −29.0242 | 0.25 | |
| 12 | Sphere | ∞ | 0.3 | (1.5231, 55) |
| 13 | Sphere | ∞ | 0.2 | |

TABLE 11

| | Asphere1 | Asphere2 | Asphere3 | Asphere4 | Asphere5 | Asphere6 |
|---|---|---|---|---|---|---|
| Y Radius | −159.6902 | −3.76011 | −2.83232 | −0.96734 | −2.09949 | 21.3874604 |
| Conic Constant (K) | 10 | 0.00575 | −1.44 | −0.1731 | −1.85 | −9.43 |
| $4^{th}$ Order Coefficient (A) | 0.0006664 | 0.02042 | −0.68483 | −0.09856 | −0.27435 | −0.0507103 |
| $6^{th}$ Order Coefficient (B) | 0.0014183 | −0.00032 | 0.69446 | 0.08103 | 0.084924 | −0.0022731 |
| $8^{th}$ Order Coefficient (C) | 3.09E−08 | 9.75E−08 | −1.38131 | −0.40495 | 1.18E−05 | 0.00018843 |
| $10^{th}$ Order Coefficient (D) | −1.94E−07 | 1.78E−07 | −0.05052 | −0.01321 | 2.16E−05 | −2.09E−05 |

TABLE 12

| Object Distance (mm) | Radius | T1 (mm) | T2 (mm) |
|---|---|---|---|
| ∞ | 4.3 | 0.4539 | 0.6961 |
| 250 | 3.904879 | 0.41529 | 0.73471 |
| 150 | 3.525772 | 0.37184 | 0.77816 |
| 90 | 3.010375 | 0.29803 | 0.85197 |
| 70 | 2.729971 | 0.24857 | 0.90143 |
| 50 | 2.358442 | 0.16335 | 0.98665 |

Figure 23:
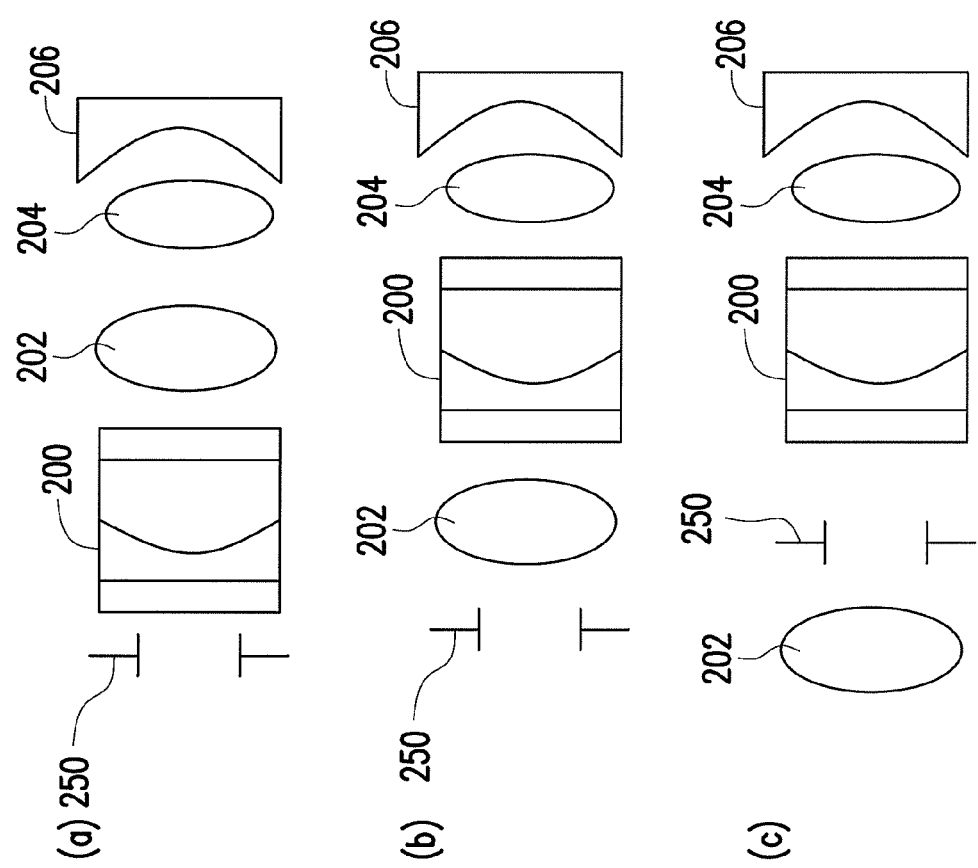
FIGS. 23-24 are cross-sectional schematic diagrams illustrating a plurality of auto-focusing lens modules having different stop and liquid zooming unit locations in accordance with a plurality of embodiments of the disclosure.
Figure 24:
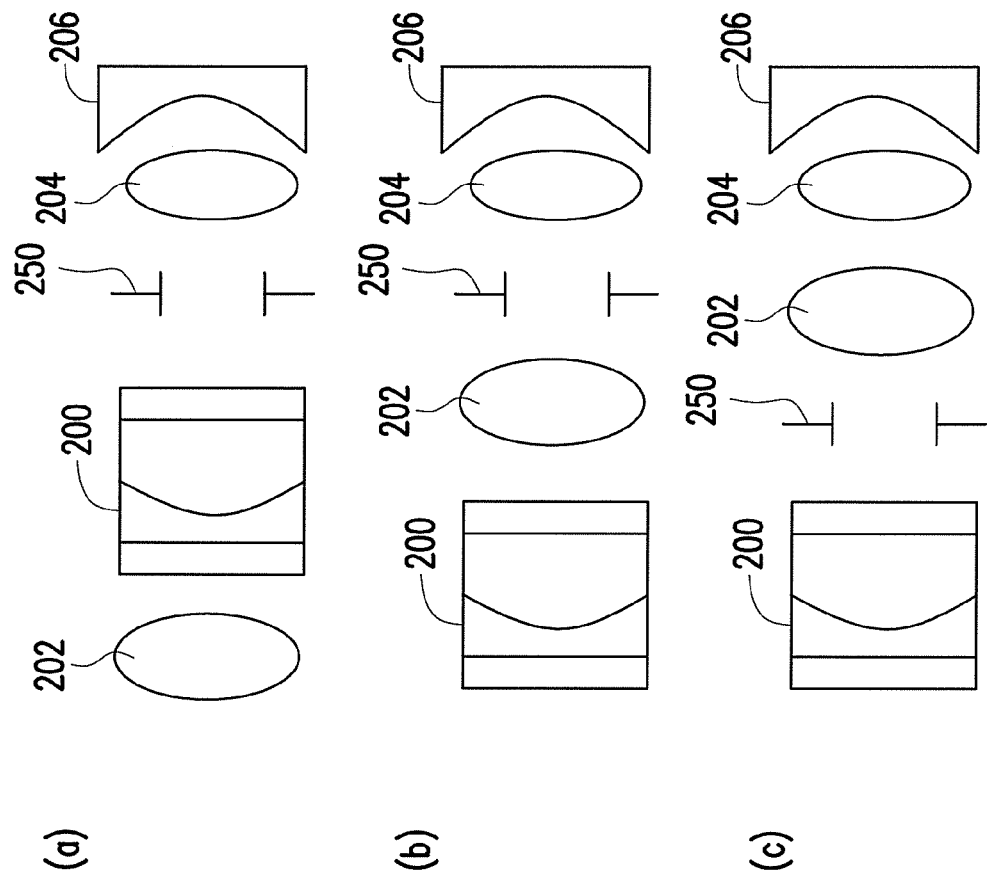

FIGS. 23-24 are cross-sectional schematic diagrams illustrating a plurality of auto-focusing lens modules having different stop and liquid zooming unit locations in accordance with a plurality of embodiments of the disclosure. Referring to FIG. 23, stop 250 is disposed in front of the liquid zooming unit 200, and three exemplary arrangements are shown in FIGS. 23(a) to 23(c). Generally, image quality is affected by how the stop location is correlated with the image lens group. For example, stop 250 shown in FIG. 23(a) can be disposed in front of liquid zooming unit 200 with no other optical components therebetween. Stop 250 shown in FIG. 23(b) can be disposed in front of lens 202. In FIG. 23(c), lens 202 is disposed in front of the liquid zooming unit 200, whereas stop 250 is disposed between lens 202 and the liquid zooming unit 200. Stop 250 shown in FIG. 23(a) can be disposed in front of the liquid zooming unit 200. As shown in FIGS. 23(b) and 23(c), since stop 250 can be disposed on lens 202, lens 202 can provide most of the manufacturing and assembling precision required, thereby lowering the precision needed for the liquid zooming unit 200 and substantially reducing costs.

Referring to FIG. 24, stop 250 is disposed behind liquid zooming unit 200, and three exemplary arrangements are shown in FIGS. 24(a) to 24(c). Since stop 250 is disposed behind the liquid zooming unit 200, the amount of transmitted light is substantially increased. Furthermore, there can be three different arrangements based on the arrangement of lens 202 with respect to the liquid zooming unit 200. Therefore, the precision considerations for the liquid zooming unit 200 can be shifted to lens 202, thereby lowering the precision needed for components of the liquid zooming unit 200 and thus substantially reducing costs.

After simulations performed to verify the optical designs, the designs shown in FIGS. 24(b) and 24(c) have substantially higher image quality while not restricting the liquid zooming unit 200 to high precision components, thereby reducing costs. In other words, to satisfy overall costs and image quality requirements, the stop position and the precision of the liquid zooming unit 200 should be considered as a whole.

Although the disclosure has been disclosed by the above embodiments, they are not intended to limit the disclosure. Anybody skilled in the art may make some modifications and alterations without departing from the spirit and scope of the disclosure. Therefore, the protection range of the disclosure falls in the appended claims.

What is claimed is:

1. An auto-focusing lens module, to focus an object image onto an image sensor, the auto-focusing lens module comprising:
   a front lens;
   a liquid zooming unit adapted with the front lens to condense the object image in front into a first-stage output light, wherein a zoom quantity of the liquid zooming unit is determined by an external control; and
   an image lens group adapted to output a second-stage output light after receiving the first-stage output light, the image lens group comprising:
      a first lens having a first surface of the first lens and a second surface of the first lens arranged farther away from the liquid zooming unit compared to the first surface of the first lens, wherein the second surface of the first lens has a convex curving surface arranged protruding on a direction away from the front lens; and
      a second lens having a first surface of the second lens and a second surface of the second lens, wherein the first surface of the second lens has a concave curving surface arranged indenting on a direction away from the front lens,
   wherein no optical element with non-zero optical power is disposed between the image lens group and the image sensor,
   wherein an absolute sag of the convex curving surface of the first lens is larger than an absolute sag of the concave curving surface, and both the convex curving surface and the concave curving surface are sagging toward the the front lens.

2. The auto-focusing lens module as claimed in claim 1, wherein a gap is disposed between the concave curving surface and the convex curving surface of the image lens group.

3. The auto-focusing lens module as claimed in claim 1, wherein at least one of the first lens of the image lens group and the front lens is combined with the liquid zooming unit to form an integrated unit.

4. The auto-focusing lens module as claimed in claim 1, wherein the concave curving surface of the second lens is spherical or aspherical, and within an effective aperture the concave curving surface does not have a secondary convex curving surface arranged opposite thereto.

5. The auto-focusing lens module as claimed in claim 1, further comprising a stop disposed in front of the liquid zooming unit.

6. The auto-focusing lens module as claimed in claim 5, wherein the liquid zooming unit is disposed in front of the front lens.

7. The auto-focusing lens module as claimed in claim 5, wherein the liquid zooming unit is disposed behind the front lens, and the stop is disposed in front of the front lens, or the stop is disposed between the front lens and the liquid zooming unit.

8. The auto-focusing lens module as claimed in claim 1, further comprising a stop disposed behind the liquid zooming unit.

9. The auto-focusing lens module as claimed in claim 8, wherein the liquid zooming unit is disposed behind the front lens.

10. The auto-focusing lens module as claimed in claim 8, wherein the liquid zooming unit is disposed in front of the front lens, and the stop is disposed behind the front lens, or the stop is disposed between the front lens and the liquid zooming unit.

11. The auto-focusing lens module as claimed in claim 1, wherein the liquid zooming unit comprises:
a first light transmissive substrate disposed near the front lens, wherein the first transmissive substrate has substantially zero optical power;
a second light transmissive substrate disposed near the first lens of the image lens group, wherein the second light transmissive substrate has substantially zero optical power;
a first liquid having a first refractive index; and
a second liquid having a second refractive index, the second liquid not soluble with the first liquid, the first liquid and the second liquid forming an interface, the first and second liquids disposed between the first light transmissive substrate and the second light transmissive substrate, and the first and second liquids are adapted to respond to the external control means to change a curvature of the interface for modifying optical power thereto.

12. The auto-focusing lens module as claimed in claim 11, wherein the front lens and the first light transmissive substrate form an integrated unit having a combined optical power not equal to zero.

13. The auto-focusing lens module as claimed in claim 11, wherein the first lens of the image lens group and the second light transmissive substrate form an integrated unit having a combined optical power not equal to zero.

14. The auto-focusing lens module as claimed in claim 11, wherein the first refractive index of the first liquid is substantially larger than the second refractive index of the second liquid.

15. The auto-focusing lens module as claimed in claim 11, wherein the first refractive index of the first liquid is substantially smaller than the second refractive index of the second liquid.

16. The auto-focusing lens module as claimed in claim 11, wherein during a focus operation of the interface formed by the first and second liquids, the interface varies in geometry from an object side to an image side in accordance with an object distance from long range to short range includes:
the interface in curving surface changing from toward the object side to toward the image side.

17. The auto-focusing lens module as claimed in claim 11, wherein during a focus operation of the interface formed by the first and second liquids, the interface varies in geometry from an object side to an image side in accordance with an object distance from long range to short range includes:
the interface in curving surface changing from toward the image side to toward the object side.

18. The auto-focusing lens module as claimed in claim 11, wherein during a focus operation of the interface formed by the first and second liquids, the interface varies in geometry from an object side to an image side in accordance with an object distance from long range to short range includes:
the interface in curving surface changing only toward the object side.

19. The auto-focusing lens module as claimed in claim 11, wherein during a focus operation of the interface formed by the first and second liquids, the interface varies in geometry from an object side to an image side in accordance with an object distance from long range to short range includes:
the interface in curving surface changing only toward the image side.

* * * * *